United States Patent
Matsuzaki et al.

(10) Patent No.: US 9,383,432 B2
(45) Date of Patent: Jul. 5, 2016

(54) POSITIONING AND TRACKING DEVICE FOR MAPPING THE MOVEMENT OF A TARGET

(71) Applicant: Mitsubishi Electric Corporation, Tokyo (JP)

(72) Inventors: Takashi Matsuzaki, Tokyo (JP); Yuki Takabayashi, Tokyo (JP); Hiroshi Kameda, Tokyo (JP); Kenta Ida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/400,944

(22) PCT Filed: Apr. 12, 2013

(86) PCT No.: PCT/JP2013/061081
§ 371 (c)(1),
(2) Date: Nov. 13, 2014

(87) PCT Pub. No.: WO2014/087683
PCT Pub. Date: Jun. 12, 2014

(65) Prior Publication Data
US 2015/0141041 A1    May 21, 2015

(30) Foreign Application Priority Data

Dec. 5, 2012  (JP) .............................. 2012-266403

(51) Int. Cl.
*H04W 24/00* (2009.01)
*G01S 5/02* (2010.01)
(Continued)

(52) U.S. Cl.
CPC ............... *G01S 5/0294* (2013.01); *B64G 3/00* (2013.01); *G01S 5/021* (2013.01); *G01S 5/14* (2013.01); *G01S 13/878* (2013.01); *H04W 4/023* (2013.01)

(58) Field of Classification Search
CPC .................................................... G01S 13/726
See application file for complete search history.

(56) References Cited

U.S. PATENT DOCUMENTS

| | | | | |
|---|---|---|---|---|
| 5,874,918 A | * | 2/1999 | Czarnecki | G01S 11/10 342/417 |
| 6,057,800 A | * | 5/2000 | Yang | G01S 19/44 342/357.31 |

(Continued)

FOREIGN PATENT DOCUMENTS

| | | |
|---|---|---|
| JP | 2003-270338 A | 9/2003 |
| JP | 2007-187468 A | 7/2007 |

(Continued)

OTHER PUBLICATIONS

International Search Report; PCT/JP2013/061081; May 14, 2013.
(Continued)

*Primary Examiner* — Tammy Pham
*Assistant Examiner* — Idowu O Osifade
(74) *Attorney, Agent, or Firm* — Studebaker & Brackett PC

(57) ABSTRACT

A tracking error covariance matrix updating unit 6 that updates a tracking error covariance matrix $P_k(-)$ before update at a sampling time k by using a nominal distance difference error parameter $\sigma\Delta_{nom}$ and that outputs the tracking error covariance matrix $P_k(+)$ after update is disposed, and a TrackDOP calculating unit 7 calculates an evaluation index TrackDOP for tracking accuracy for a target by using both the tracking error covariance matrix $P_k(+)$ after update, and the nominal observation error parameter $\sigma\Delta_{nom}$.

8 Claims, 18 Drawing Sheets

(51) Int. Cl.
  *B64G 3/00* (2006.01)
  *G01S 5/14* (2006.01)
  *G01S 13/87* (2006.01)
  *H04W 4/02* (2009.01)

(56) References Cited

U.S. PATENT DOCUMENTS

| | | | |
|---|---|---|---|
| 6,266,584 B1 * | 7/2001 | Hur-Diaz | G01C 21/00 244/158.1 |
| 7,170,441 B2 | 1/2007 | Perl et al. | |
| 2010/0013697 A1 | 1/2010 | De Waard et al. | |
| 2010/0171659 A1 * | 7/2010 | Waters | H04B 17/24 342/357.74 |

FOREIGN PATENT DOCUMENTS

| | | |
|---|---|---|
| JP | 2010-281782 A | 12/2010 |
| WO | 2008/031896 A1 | 3/2008 |

OTHER PUBLICATIONS

Ueda, E. et al.; "About multilateration for airport surface monitoring"; Electronic Navigation Research Institute Presentation Meeting; Jun. 11, 2011.

* cited by examiner

FIG.4
(a)
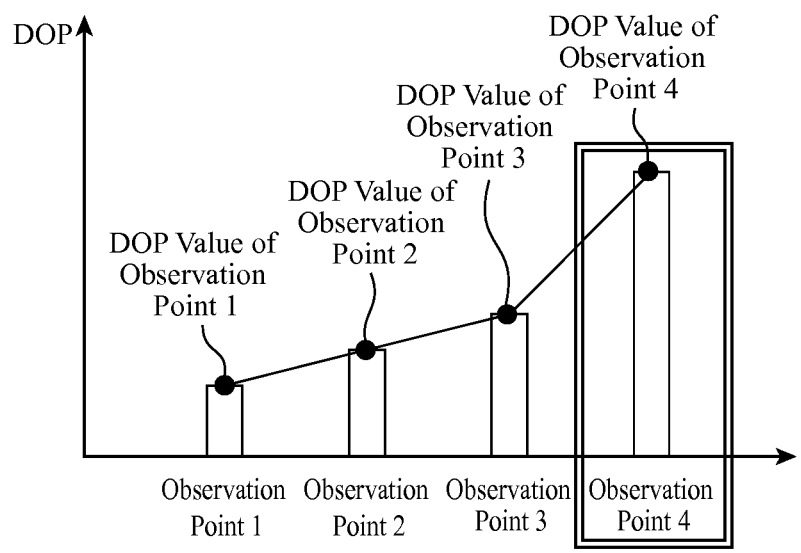
(b)
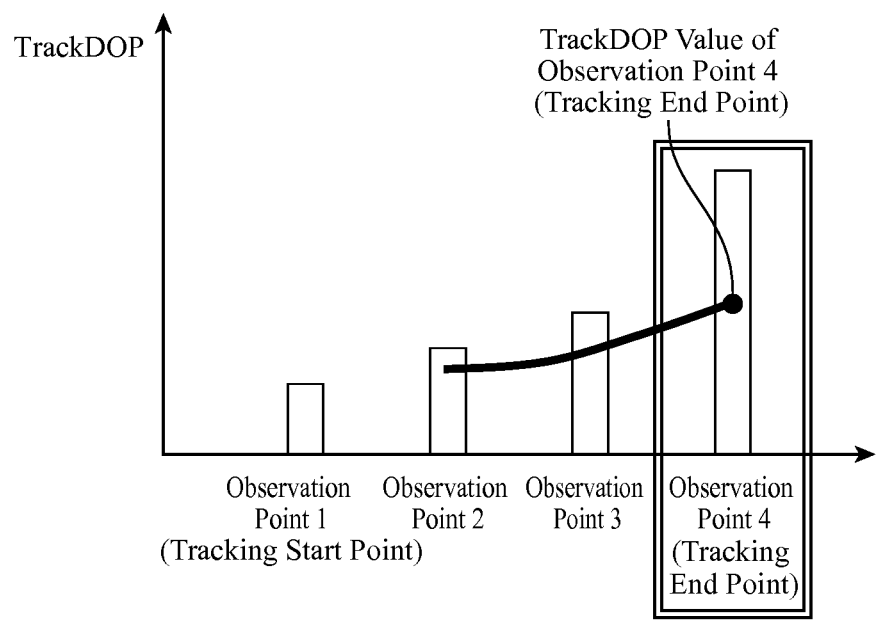

(a) (b)

POSITIONING AND TRACKING DEVICE FOR MAPPING THE MOVEMENT OF A TARGET

FIELD OF THE INVENTION

The present invention relates to a positioning and tracking device that presents an evaluation index for positioning accuracy and an evaluation index for tracking accuracy for each of observation points leading from a tracking start point of a target to a tracking end point of the target.

BACKGROUND OF THE INVENTION

FIG. 16 is an explanatory drawing showing measurement of the position of a target which is carried out by a positioning and tracking device disclosed in the following nonpatent reference 1.

In the example shown in FIG. 16, the position of the target, such as an airplane or a satellite, is measured by using distance differences provided by four receiving stations, and DOPs (Dilutions Of Precision) which are evaluation indices for the positioning accuracy for the target are calculated from the measured position of the target.

Hereafter, a method of calculating evaluation indices DOPs for the positioning accuracy for a target will be explained.

In the case of measuring the three-dimensional position of a target by using distance differences provided by receiving stations, the required minimum number of receiving stations is four. Although four or more receiving stations can be used when measuring the three-dimensional position of a target, the three-dimensional position cannot be calculated in the case of using three receiving stations.

Further, in the case of measuring the two-dimensional position of a target by using distance differences provided by receiving stations, the required minimum number of receiving stations is three. Although three or more receiving stations can be used when measuring the two-dimensional position of a target, the two-dimensional position cannot be calculated in the case of using two receiving stations.

When the target is an airplane (including a satellite or the like), the distance between the target and a receiving station can be measured by the receiving station receiving a signal transmitted from the transponder of the target.

Assuming that the distance measured by a receiving station (i) (i=1, 2, 3) is expressed by $r_i$ and a receiving station (0) is a reference receiving station (referred to as the "reference station" from here on), the distance difference between the receiving station (i) and the reference station is given by $r_i - r_0$. In this specification, the distance difference between the receiving station (i) and the reference station is referred to as the distance difference of the receiving station (i) in some cases.

When the distance difference between each of the receiving stations (1) to (3) and the reference station in FIG. 16 is expressed by mathematical expressions, these expressions are given by the following equations (1) to (3). In this specification, a symbol to which an underline is attached shows a vector.

$$f_1(Z_{tgt}) = r_1 - r_0 = |Z_{tgt} - Z_{sns1}| - |Z_{tgt} - Z_{sns0}| \quad (1)$$

$$f_2(Z_{tgt}) = r_2 - r_0 = |Z_{tgt} - Z_{sns2}| - |Z_{tgt} - Z_{sns0}| \quad (2)$$

$$f_3(Z_{tgt}) = r_3 - r_0 = |Z_{tgt} - Z_{sns3}| - |Z_{tgt} - Z_{sns0}| \quad (3)$$

$$r_0 = |Z_{tgt} - Z_{sns0}| \quad (4)$$

$$r_1 = |Z_{tgt} - Z_{sns1}| \quad (5)$$

$$r_2 = |Z_{tgt} - Z_{sns2}| \quad (6)$$

$$r_3 = |Z_{tgt} - Z_{sns3}| \quad (7)$$

$$Z_{tgt} = [X, Y, Z]' \quad (8)$$

$$Z_{snsi} = [X_{snsi}, Y_{snsi}, Z_{snsi}]' \quad (9)$$

In the equations (1) to (9), $r_0$ is the distance between the target and the reference station, $r_1$ is the distance between the target and the receiving station (1), $r_2$ is the distance between the target and the receiving station (2), and $r_3$ is the distance between the target and the receiving station (3).

Further, $Z_{tgt}$ is the target position (vector), and $Z_{snsi}$ is the position (vector) (i=1, 2, 3) of the receiving station (i).

$f_i(Z_{tgt})$ is a function of the target position $Z_{tgt}$, the function regarding the distance difference of the receiving station (i).

|A| is the Euclidean norm of a vector A, and $|Z_{tgt} - Z_{snsi}|$ (i=1, 2, 3) is the Euclidean norm of a vector $Z_{tgt} - Z_{snsi}$ and shows the distance $r_i$ between the target and the receiving station (i).

Further, X, Y, and Z in the right-hand side of the equation (8) are X, Y, and Z components of the target position, and $X_{snsi}, Y_{snsi}$, and $Z_{snsi}$ in the right-hand side of the equation (9) are X, Y, and Z components of the receiving station.

In addition, A' shows the transposition of the vector A, and the same goes for a matrix.

When the equations (1) to (3) are generalized for each of the receiving stations (i) (i=1, 2, 3), the following equation (10) is provided.

$$f_i(Z_{tgt}) = r_i - r_0 = |Z_{tgt} - Z_{snsi}| - |Z_{tgt} - Z_{sns0}| \quad (10)$$

When the distance differences $f_1(Z_{tgt}), f_2(Z_{tgt})$, and $f_3(Z_{tgt})$ between the receiving stations (1) to (3) and the reference station are differentiated with respect to the target position vector, Jacobians which are the results of the differentiation are given by the following equations (11) to (13).

$$G_1 = [\partial f_1/\partial x \quad \partial f_1/\partial y \quad \partial f_1/\partial z] \quad (11)$$

$$G_2 = [\partial f_2/\partial x \quad \partial f_2/\partial y \quad \partial f_2/\partial z] \quad (12)$$

$$G_3 = [\partial f_3/\partial x \quad \partial f_3/\partial y \quad \partial f_3/\partial z] \quad (13)$$

$$G = \begin{pmatrix} G_1 \\ G_2 \\ G_3 \end{pmatrix} \quad (14)$$

In the equations (11) to (13), $G_1$ is the Jacobian of the distance difference of the receiving station (1), $G_2$ is the Jacobian of the distance difference of the receiving station (2), and $G_3$ is the Jacobian of the distance difference of the receiving station (3).

G is a combination of $G_1, G_2$, and $G_3$, and the matrix G is referred to as the all-receiving-stations Jacobian matrix in some cases.

$\partial f_i/\partial x$ (i=1, 2, 3) is the partial differential of the distance difference of each receiving station (i) with respect to x, $\partial f_i/\partial y$ (i=1, 2, 3) is the partial differential of the distance difference of each receiving station (i) with respect to y, and $\partial f_i/\partial z$ (i=1, 2, 3) is the partial differential of the distance difference of each receiving station (i) with respect to z.

The all-receiving-stations Jacobian matrix G in the equation (14) increases in size with respect to the row direction of G with increase in the number of receiving stations.

In the example of the equations (11) to (14), the target to be estimated is the target position [x, y, z]. When the target to be estimated includes the target position (x, y, z), a target velocity (vx, vy, vz), and a receiving station clock bias δt, the target to estimated is [x, y, z, vx, vy, vz, δt] and is enlarged with respect to the column direction of G. More specifically, the size of the matrix G changes according to the number of receiving stations for the target to be estimated and the dimensionality of vectors.

When calculating evaluation indices DOPs for the positioning accuracy for the target, a matrix D is calculated from the all-receiving-stations Jacobian matrix G of the target position at one certain point, as shown in the following equation (15).

$$D = \text{inv}(G'G) \quad (15)$$

In the equation (15), inv( ) means a function of calculating an inverse matrix.

In the example shown in FIG. 16, the matrix D in the equation (15) has 3 rows and 3 columns as shown in the following equation (16).

Further, when up to the three-dimensional position and the receiving station clock bias are included in the target to be estimated, the matrix D has 4 rows and 4 columns as shown in the following equation (17). $D_{11}, \ldots,$ and $D_{44}$ show elements of the matrix.

$$D = \begin{pmatrix} D_{11} & D_{12} & D_{13} \\ D_{21} & D_{22} & D_{23} \\ D_{31} & D_{32} & D_{33} \end{pmatrix} \quad (16)$$

$$D = \begin{pmatrix} D_{11} & D_{12} & D_{13} & D_{14} \\ D_{21} & D_{22} & D_{23} & D_{24} \\ D_{31} & D_{32} & D_{33} & D_{34} \\ D_{41} & D_{42} & D_{43} & D_{44} \end{pmatrix} \quad (17)$$

As the types of evaluation indices DOPs for the positioning accuracy for the target, there are GDOP (Geometric Dilution Of Precision) regarding geometry, PDOP (Position Dilution Of Precision) regarding position, HDOP (Horizontal Dilution Of Precision) regarding horizontal position, VDOP (Vertical Dilution Of Precision) regarding vertical position, and TDOP (Time Dilution Of Precision) regarding clock bias, etc.

Arithmetic expressions for calculating GDOP, PDOP, HDOP, VDOP, and TDOP are expressed by the following equations (18) to (22), respectively.

Hereafter, the matrix D when up to the three-dimensional position and the receiving station clock bias are included in the target to be estimated, as shown in the equation (17), is assumed. When up to the three-dimensional position is included in the target to be estimated, as shown in the equation (16), GDOP=PDOP.

$$\text{GDOP} = \text{sqrt}(D_{11} + D_{22} + D_{33} + D_{44}) \quad (18)$$

$$\text{PDOP} = \text{sqrt}(D_{11} + D_{22} + D_{33}) \quad (19)$$

$$\text{HDOP} = \text{sqrt}(D_{11} + D_{22}) \quad (20)$$

$$\text{VDOP} = \text{sqrt}(D_{33}) \quad (21)$$

$$\text{TDOP} = \text{sqrt}(D_{44}) \quad (22)$$

Although the evaluation indices DOP for the positioning accuracy for the target are calculated the above-mentioned way, the conventional positioning and tracking device has problems which are divided into three general groups.

[Problem 1]

When the number of receiving stations does not reach the one required to estimate the target position (when the distance differences cannot be acquired), there is a problem that the three-dimensional position of the target cannot be calculated and the calculation of DOPs cannot be performed either.

FIG. 17 is an explanatory drawing showing a situation in which the distance cannot be acquired by the receiving station (1) because of blocking by buildings, and the distance difference of the receiving station (1) cannot be acquired as a result.

FIG. 18 is an explanatory drawing showing an example of the problem 1, a number line in an upper row shows an input situation of each receiving station for which the distance difference is acquired, and a number line in a lower row shows a positioning situation.

In the example of FIG. 18, although at a time t1, the distance differences between the reference station and the receiving stations (1) to (3) are acquired, and the calculation of the three-dimensional position is performed, at a time t2, the distance of the receiving station (1) cannot be acquired under the influence of blocking by buildings or the like and the distance difference between the reference station and the receiving station (1) cannot be acquired, and therefore the calculation of the three-dimensional position cannot be performed. At a time t3, the calculation of the three-dimensional position is performed in the same way as that at the time t1.

[Problem 2]

There is a problem that although the number of receiving stations reaches the one required to estimate the target position, the positioning may become impossible from a viewpoint of numerical computations because the placement of each receiving station is bad.

FIG. 19 is an explanatory drawing showing an example of the problem 2, a number line in an upper row shows an input situation of each receiving station for which the distance difference is acquired, and a number line in a lower row shows a positioning situation.

In the example of FIG. 19, although at times t1 and t3, the distance differences between the reference station and the receiving stations (1) to (3) are acquired, and the calculation of the three-dimensional position is performed, at a time t2, the positioning becomes impossible from a viewpoint of numerical computations because the placement of each receiving station is bad.

Although the matrix D calculated by using the equation (16) or (17) is used when calculating the evaluation indices DOP for the positioning accuracy, the row elements of the all-receiving-stations Jacobian matrix G shown in the equation (14) becomes substantially the same as each other because the distances and the distance differences for the target are substantially the same as each other in the case of the placement of each receiving station at the time t2.

As a result, when calculating the inverse matrix of the all-receiving-stations Jacobian matrix G by using the equation (15), there is a case in which the rank of the matrix drops and the inverse matrix cannot be calculated.

Therefore, it is expected that even if the all-receiving-stations Jacobian matrix G can be calculated, the matrix D necessary for the calculation of the evaluation indices DOPs for the positioning accuracy cannot be calculated and therefore the evaluation indices DOPs for the positioning accuracy cannot be calculated, and, as a result, the positioning and tracking device falls into a state in which the positioning and tracking device cannot calculate the three-dimensional position from a viewpoint of numerical computations.

It is also expected that even when the evaluation indices DOPs for the positioning accuracy can be calculated, the values of the DOPs are large. In principle, it is natural that the values of the DOPs are large.

[Problem 3]

In order to improve a situation in which, for example, the three-dimensional position cannot be calculated at the time t2, as shown in Problems 1 and 2, there can be provided a method of performing interpolation calculation or extrapolation calculation by using three-dimensional positions measured at two or more observation points to measure the three-dimensional position at the time t2.

FIG. 20 is an explanatory drawing showing an example of performing interpolation calculation or extrapolation calculation to measure the three-dimensional position at the time t2. The three-dimensional position acquired through interpolation calculation or extrapolation calculation is expresses by ▲.

Although the three-dimensional position can be measured if interpolation calculation or extrapolation calculation is performed even in a case in which the number of receiving stations does not reach the one required to estimate the target position, the evaluation indices DOPs for the positioning accuracy cannot be calculated.

Although the problems arising in the case of measuring the target position from the distance differences between the reference station and the receiving stations (1) to (3) is explained until now, the problems 1 to 3 similarly arise in the case of measuring the target position from the distances between the reference station and the receiving stations (1) to (3), as shown in FIG. 21.

RELATED ART DOCUMENT

Nonpatent Reference

Nonpatent reference 1: Ueda, Miyazaki, Kakubari, Nihei, and Koga, "About multilateration for airport surface monitoring", Electronic Navigation Research Institute Research Presentation Meeting, 11th, June, Heisei 23.

SUMMARY OF THE INVENTION

Problems to be Solved by the Invention

Because the conventional positioning and tracking device is constructed as mentioned above, there is a problem that when, for example, the number of receiving stations does not reach the one required to estimate the target position, the measurement of the target position and the calculation of the evaluation indices DOP for the positioning accuracy cannot be carried out.

Further, there is a problem that although the three-dimensional position can be measured by performing interpolation calculation or extrapolation calculation even in a case in which the number of receiving stations does not reach the one required to estimate the target position, the evaluation indices DOPs for the positioning accuracy cannot be calculated.

The present invention is made in order to solve the above-mentioned problems, and it is therefore an object of the present invention to provide a positioning and tracking device that can present evaluation indices for the tracking accuracy for a target even in a situation in which the measurement of the target position and the calculation of evaluation indices for the positioning accuracy cannot be carried out.

Means for Solving the Problem

In accordance with the present invention, there is provided a positioning and tracking device including: an observed value acquiring unit that acquires observed values of a plurality of receiving stations for each of observation points leading from a tracking start point of a target to a tracking end point of the target; a Jacobian matrix calculator that calculates a Jacobian matrix of observed values associated with all the receiving stations by using the observed values acquired by the observed value acquiring unit; a positioning accuracy evaluation index calculator that calculates an evaluation index for positioning accuracy for the target by using the Jacobian matrix calculated by the Jacobian matrix calculator; a tracking error covariance matrix calculator that calculates a covariance matrix of positioning errors by using both the Jacobian matrix calculated by the Jacobian matrix calculator and a preset nominal observation error parameter, and that calculates a covariance matrix of tracking errors from the covariance matrices of positioning errors at first two observation points; a tracking error covariance matrix updater that updates the covariance matrix of tracking errors calculated by the tracking error covariance matrix calculator by using the nominal observation error parameter; and a tracking accuracy evaluation index calculator that calculates an evaluation index for tracking accuracy for the target by using both the covariance matrix of tracking errors updated by the tracking error covariance matrix updater and the nominal observation error parameter, in which an evaluation index presenter presents the evaluation index for the positioning accuracy calculated by the positioning accuracy evaluation index calculator and the evaluation index for the tracking accuracy calculated by the tracking accuracy evaluation index calculator.

Advantages of the Invention

In accordance with the present invention, because the positioning and tracking device is constructed in such a way that it includes the tracking error covariance matrix calculator that calculates the covariance matrix of positioning errors by using both the Jacobian matrix calculated by the Jacobian matrix calculator and the preset nominal observation error parameter, and that calculates the covariance matrix of tracking errors from the covariance matrices of positioning errors at the first two observation points, the tracking error covariance matrix updater that updates the covariance matrix of tracking errors calculated by the tracking error covariance matrix calculator by using the nominal observation error parameter, and the tracking accuracy evaluation index calculator that calculates an evaluation index for tracking accuracy for the target by using both the covariance matrix of tracking errors updated by the tracking error covariance matrix updater and the nominal observation error parameter, and the evaluation index presenter presents the evaluation index for the positioning accuracy calculated by the positioning accuracy evaluation index calculator and the evaluation index for the tracking accuracy calculated by the tracking accuracy evaluation index calculator, there is provided an advantage of being able to present the evaluation index for the tracking accuracy for the target even in a situation in which the measurement of the target position and the calculation of the evaluation index for the positioning accuracy cannot be carried out.

BRIEF DESCRIPTION OF THE FIGURES

FIG. 4 is an imaged figure showing an expected effect of evaluation indices TrackDOPs for tracking accuracy;

EMBODIMENTS OF THE INVENTION

Hereafter, in order to explain this invention in greater detail, the preferred embodiments of the present invention will be described with reference to the accompanying drawings.

Embodiment 1

In this Embodiment 1, an example of calculating the three-dimensional position of a target by using four receiving stations (i) (i=0, 1, 2, 3) will be explained.

Figure 1:
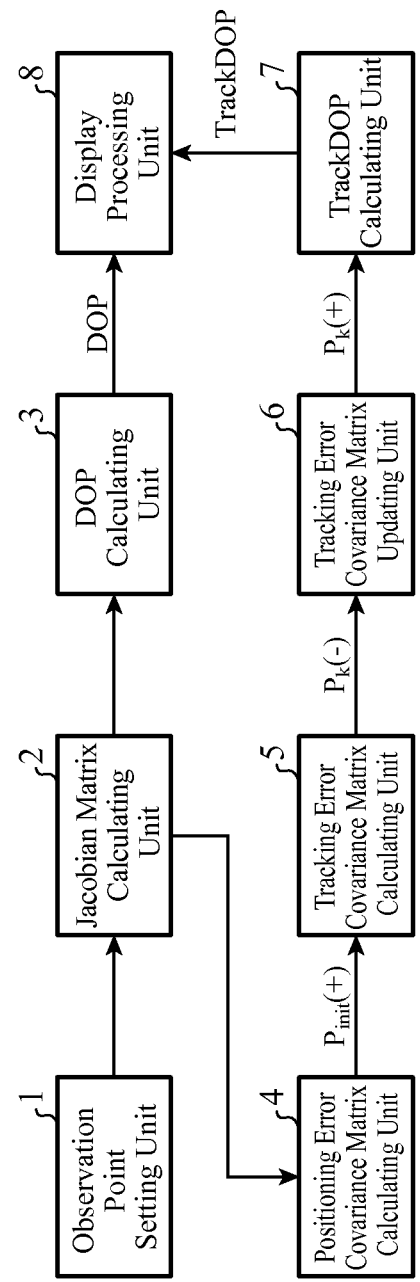
FIG. 1 is a structural diagram showing a positioning and tracking device in accordance with Embodiment 1 of the present invention.

FIG. 1 is a structural diagram showing a positioning and tracking device in accordance with Embodiment 1 of the present invention.

Referring to FIG. 1, an observation point setting unit 1 performs a process of setting up observation points leading from a tracking start point Pstart to a tracking endpoint Pend.

A Jacobian matrix calculating unit 2 performs a process of acquiring observed values of the four receiving stations (i) (i=0, 1, 2, 3) for each of the observation points set up by the observation point setting unit 1.

More specifically, the Jacobian matrix calculating unit 2 performs a process of acquiring, as the observed values of the four receiving stations (i), the distance difference $r_i-r_0$ between the distance $r_0$ from the reference receiving station (0) to the target, and the distance $r_i$ from each of the receiving stations (i) (i=1, 2, 3) to the target for each of the observation points set up by the observation point setting unit 1.

Further, the Jacobian matrix calculating unit 2 performs a process of calculating an all-receiving-stations Jacobian matrix G (a Jacobian matrix of the distance differences associated with all the receiving stations) by using the distance difference $r_i-r_0$. The Jacobian matrix calculating unit 2 constructs an observed value acquiring unit and a Jacobian matrix calculator.

A DOP calculating unit 3 performs a process of calculating evaluation indices DOPs for positioning accuracy for the target by using the all-receiving-stations Jacobian matrix G calculated by the Jacobian matrix calculating unit 2. The DOP calculating unit 3 constructs a positioning accuracy evaluation index calculator.

A positioning error covariance matrix calculating unit 4 performs a process of calculating a positioning error covariance matrix $B_{pos}$ which is a covariance matrix of positioning errors by using both a matrix D calculated from the all-receiving-stations Jacobian matrix G calculated by the Jacobian matrix calculating unit 2, and a preset nominal observation error parameter, and calculating an initial value $P_{init}(+)$ of a tracking error covariance matrix $P_k(-)$ which is a covariance matrix of tracking errors at a sampling time t=k from the positioning error covariance matrices $B_{pos}(s)$ at the first two observation points.

A tracking error covariance matrix calculating unit 5 performs a process of calculating the tracking error covariance matrix $P_k(-)$ before update by using the initial value $P_{init}(+)$ of the tracking error covariance matrix $P_k(-)$ calculated by the positioning error covariance matrix calculating unit 4.

A tracking error covariance matrix calculator is comprised of the positioning error covariance matrix calculating unit 4 and the tracking error covariance matrix calculating unit 5.

A tracking error covariance matrix updating unit 6 performs a process of updating the tracking error covariance matrix $P_k(-)$ calculated by the tracking error covariance matrix calculating unit 5 by using the nominal observation error parameter, and outputting the tracking error covariance matrix $P_k(+)$ after update to a TrackDOP calculating unit 7.

The tracking error covariance matrix updating unit 6 constructs a tracking error covariance matrix updater.

The TrackDOP calculating unit 7 performs a process of calculating evaluation indices TrackDOPs for tracking accuracy for the target by using both the tracking error covariance matrix $P_k(+)$ after update outputted from the tracking error covariance matrix updating unit 6 and the nominal observation error parameter. The TrackDOP calculating unit 7 constructs a tracking accuracy evaluation index calculator.

A display processing unit 8 performs a process of displaying the evaluation indices DOPs for the positioning accuracy calculated by the DOP calculating unit 3, and the evaluation indices TrackDOPs for the tracking accuracy calculated by the TrackDOP calculating unit 7 on a display or the like. The display processing unit 8 constructs an evaluation index presenter.

In the example of FIG. 1, it is assumed that each of the observation point setting unit 1, the Jacobian matrix calculating unit 2, the DOP calculating unit 3, the positioning error covariance matrix calculating unit 4, the tracking error covariance matrix calculating unit 5, the tracking error covariance matrix updating unit 6, the TrackDOP calculating unit 7, and the display processing unit 8, which are the components of the positioning and tracking device, consists of hardware for exclusive use (e.g., a semiconductor integrated circuit equipped with a CPU, or a one chip microcomputer). As an alternative, the positioning and tracking device can consist of a computer.

In the case in which the positioning and tracking device consists of a computer, a program which the processes carried out by the observation point setting unit 1, the Jacobian matrix calculating unit 2, the DOP calculating unit 3, the positioning error covariance matrix calculating unit 4, the tracking error covariance matrix calculating unit 5, the tracking error covariance matrix updating unit 6, the TrackDOP calculating unit 7, and the display processing unit 8 are described can be stored in a memory of the computer, and a CPU of the computer can be made to execute the program stored in the memory.

Next, the operation of the positioning and tracking device will be explained.

First, the observation point setting unit 1 sets up a tracking endpoint Pend which is an observation point where the tracking of the target will be ended.

Figure 2:
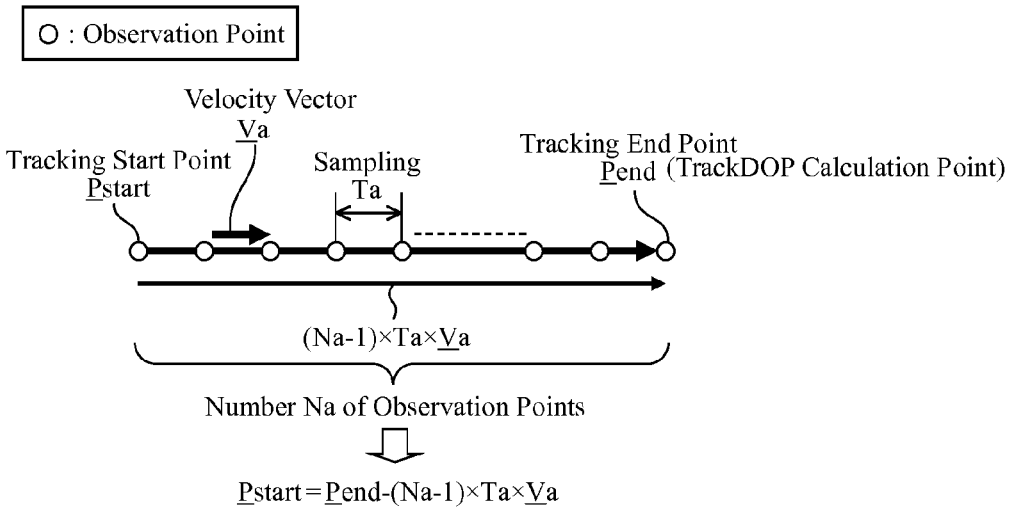
FIG. 2 is an explanatory drawing showing observation points leading from a tracking start point Pstart of a target to a tracking end point Pend of the target.

FIG. 2 is an explanatory drawing showing observation points leading from a tracking start point Pstart of the target to the tracking end point Pend of the target. The observation points correspond to time-series target positions leading from the tracking start point Pstart to the tracking endpoint Pend.

After setting up the tracking end point Pend, the observation point setting unit 1 calculates the target tracking start point Pstart, by using, as parameters, the tracking end point Pend, a sampling Ta, a velocity vector Va of the target, and the number Na of observation points, as shown in FIG. 2, thereby setting up the observation points leading from the tracking start point Pstart to the tracking end point Pend.

$$Pstart = Pend - (Na-1) \times Ta \times Va \qquad (23)$$

After the observation point setting unit 1 sets up the observation points leading from the tracking start point Pstart to the tracking end point Pend, the Jacobian matrix calculating unit 2 acquires the distance difference $r_i - r_0$ between the distance $r_0$ from the receiving station (0) which is the reference station to the target, and the distance $r_i$ from each of the receiving stations (i) (i=1, 2, 3) to the target for each of the observation points.

Figure 3:
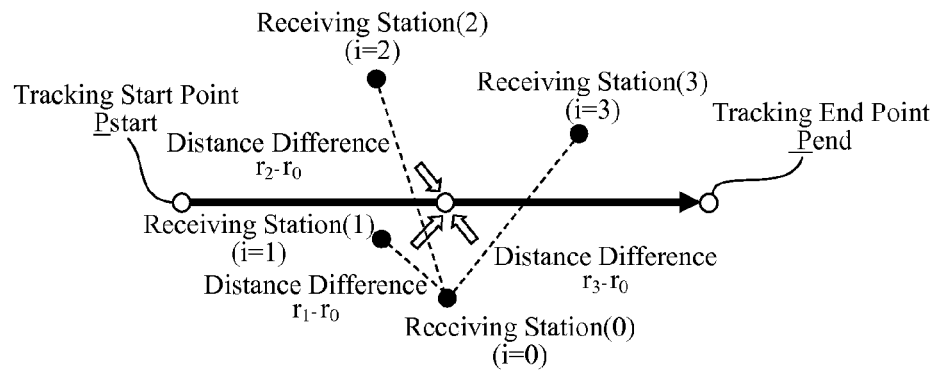
FIG. 3 is an explanatory drawing showing an example of acquiring distance differences $r_i-r_0$ between a reference station and receiving stations (1) to (3)

FIG. 3 is an explanatory drawing showing an example of acquiring the distance difference $r_i - r_0$ between the reference station and each of the receiving stations (1) to (3).

Although the case in which the number of receiving stations is four is shown in the example of FIG. 3, the number of receiving stations can also be increased or decreased, and information showing whether the reception of the distance difference is enabled or disabled can be set for each receiving station. Further, information showing whether the reception of the distance difference is enabled or disabled can be set for each observation point.

After acquiring the distance difference $r_i - r_0$ between the reference station and each of the receiving stations (1) to (3), the Jacobian matrix calculating unit 2 calculates an all-receiving-stations Jacobian matrix G by using the distance difference $r_i - r_0$, as shown in the above-mentioned equation (14).

Although the example in which the number of receiving station is four is shown in this embodiment, the Jacobian matrix for all the receiving stations can be increased or decreased by using matrices whose number is larger than the required number of receiving stations according to the dimension of data, such as the position to be estimated, and so on.

After the Jacobian matrix calculating unit 2 calculates the all-receiving-stations Jacobian matrix G, the DOP calculating unit 3 calculates a matrix D given by the equation (16) or (17) from the all-receiving-stations Jacobian matrix G according to the equation (15). Although the DOP calculating unit 3 calculates the matrix D in this example, the Jacobian matrix calculating unit 2 can alternatively calculate the matrix D and output the matrix D to the DOP calculating unit 3.

After calculating the matrix D given by the equation (16) or (17), the DOP calculating unit 3 calculates evaluation indices DOPs for the positioning accuracy for the target by using the matrix D.

More specifically, the DOP calculating unit calculates GDOP regarding geometry, PDOP regarding the position, HDOP regarding the position in a horizontal direction, VDOP regarding the position in a vertical direction, and TDOP regarding a clock bias, which are shown by the equations (18) to (22), respectively.

Because the all-receiving-stations Jacobian matrix G shown in the equation (14) is used to estimate the three-dimensional position, the corresponding matrix D is shown by the equation (16). In this case, TDOP is not calculated. The matrix D corresponding to a case of estimating the three-dimensional position and the clock bias is shown by the equation (17), and, when the three-dimensional position and the clock bias are estimated, can be extended easily in such a way that TDOP is calculated.

After the Jacobian matrix calculating unit 2 calculates the all-receiving-stations Jacobian matrix G, the positioning error covariance matrix calculating unit 4 calculates the matrix D shown by the equation (16) or (17) from the all-receiving-stations Jacobian matrix G according to the equation (15). Although the positioning error covariance matrix calculating unit 4 calculates the matrix D in this embodiment, the Jacobian matrix calculating unit 2 can alternatively calculate the matrix D and output the matrix D to the positioning error covariance matrix calculating unit 4.

After calculating the matrix D given by the equation (16) or (17), the positioning error covariance matrix calculating unit 4 calculates a positioning error covariance matrix $B_{pos}$ which is a covariance matrix of positioning errors by using both the matrix D and a nominal distance difference error parameter $\sigma\Delta_{rnom}$ (nominal observation error parameter) showing variations in the observed values of the distance differences, as shown in the following equation (24). The nominal distance difference error parameter $\sigma\Delta_{rnom}$ is set up by the user in consideration of noise occurring in the receiving stations.

$$B_{pos} = (\sigma\Delta_{rnom})^2 \times D \quad (24)$$

Although the nominal distance difference error parameter $\sigma\Delta_{rnom}$ is used in this Embodiment 1 because the observed values of the receiving stations are the distance differences, the nominal distance difference error parameter $\sigma\Delta_{rnom}$ may be referred to as the nominal observation error parameter in such a way that even a case in which the observed values of the receiving stations are distances or angles, instead of the distance differences, can be supported.

After calculating the positioning error covariance matrix $B_{pos}$, the positioning error covariance matrix calculating unit 4 calculates an initial value $P_{init}(+)$ of a tracking error covariance matrix $P_k(-)$ which is a covariance matrix of tracking errors at a sampling time t=k from the positioning error covariance matrices $B_{pos}(s)$ at the first two observation points (the tracking start point Pstart which is the first observation point, and the observation point next to the tracking start point Pstart), as shown in the following equation (25).

$$P_{init}(+) = \begin{pmatrix} P_{init}(+)(1,1) & P_{init}(+)(1,2) \\ P_{init}(+)(2,1) & P_{init}(+)(2,2) \end{pmatrix} \quad (25)$$

In the equation (25) $P_{init}(+)(1,1)$ $P_{init}(+)(1,2)$ $P_{init}(+)(2,1)$, and $P_{init}(+)(2,2)$ are matrices of elements of the initial value $P_{init}(+)$ of the tracking error covariance matrix $P_k(-)$, and are calculated by using the following equations (26) to (29).

$$P_{init}(+)(1,1) = B_{pos2} \quad (26)$$

$$P_{init}(+)(1,2) = B_{pos2}/Ta \quad (27)$$

$$P_{init}(+)(2,1) = B_{pos2}/Ta \quad (28)$$

$$P_{init}(+)(2,2) = (B_{pos2} + B_{pos1})/Ta^2 \quad (29)$$

where $B_{pos1}$ is the positioning error covariance matrix $B_{pos}$ at the tracking start point Pstart, and $B_{pos2}$ is the positioning error covariance matrix $B_{pos}$ at the observation point next to the tracking start point Pstart.

After the positioning error covariance matrix calculating unit 4 calculates the initial value $P_{init}(+)$ of the tracking error covariance matrix $P_k(-)$, the tracking error covariance matrix calculating unit 5 calculates the tracking error covariance matrix $P_k(-)$ before update at the sampling time k by using the initial value $P_{init}(+)$ of the tracking error covariance matrix $P_k(-)$, as shown in the following equation (30).

$$P_k(-) = \Phi_{k-1} \times P_{k-1}(+) \times \Phi_{k-1}^T + Q_{k-1} \quad (30)$$

In the equation (30), $\Phi_{k-1}$ is a state transition matrix, $P_{k-1}(+)$ is the tracking error covariance matrix after update at a sampling time k-1, T is the transpose of a matrix, and $Q_{k-1}$ is a driving noise covariance matrix in which ambiguity of the target is set. × means a multiplication between scalars or matrices.

The tracking error covariance matrix $P_2(+)$ before update at the sampling time k=2 is set to be the initial value $P_{init}(+)$ of the tracking error covariance matrix $P_k(-)$ which is calculated by using the equation (25), as shown in the following equation (31).

$$P_2(+) = P_{init}(+) \quad (31)$$

After the tracking error covariance matrix calculating unit 5 calculates the tracking error covariance matrix $P_k(-)$ before update at the sampling time k, the tracking error covariance matrix updating unit 6 updates the tracking error covariance matrix $P_k(-)$ by using the nominal distance difference error parameter $\sigma\Delta_{rnom}$ at the current time, as shown in the following equation (32), and outputs the tracking error covariance matrix $P_k(+)$ after update at the sampling time k to the TrackDOP calculating unit 7.

$$P_k(+) = P_k(-) - P_k(-) \times H_{ki}^T \times [H_{ki} P_k(-) H_{ki}^T + B_{ki}]^{-1} \times H_{ki} \times P_k(-) \quad (32)$$

In the equation (32), $H_{ki}$ is an observation matrix of the receiving station i at the sampling time k, and $B_{ki}$ is an observation error covariance matrix of the receiving station i at the sampling time k.

The observation matrix $H_{ki}$ of the receiving station i at the sampling time k is expressed by the following equation (33), and its elements are expressed by the following equation (34).

$$H_{ki} = [H_{ki}(1,1) H_{ki}(1,2) H_{ki}(1,3) H_{ki}(1,4) H_{ki}(1,5) H_{ki}(1,6)] \quad (33)$$

$$H_{ki}(1,1) = \partial f_i/\partial x$$

$$H_{ki}(1,2) = \partial f_i/\partial y$$

$$H_{ki}(1,3) = \partial f_i/\partial z$$

$$H_{ki}(1,4) = 0$$

$$H_{ki}(1,5) = 0$$

$$H_{ki}(1,6) = 0 \quad (34)$$

Further, the observation error covariance matrix $B_{ki}$ of the receiving station i at the sampling time k is calculated from the nominal distance difference error parameter $\sigma\Delta_{rnom}$ at the current time, as shown in the following equation (35).

$$B_{ki} = \sigma\Delta_{rnom}^2 \quad (35)$$

When receiving the tracking error covariance matrix $P_k(+)$ after update at the sampling time k from the tracking error covariance matrix updating unit 6, the TrackDOP calculating unit 7 calculates evaluation indices TrackDOPs for the tracking accuracy (dilutions of precision in tracking) for the target by using both the tracking error covariance matrix $P_k(+)$ and the nominal observation error parameter $\sigma\Delta_{rnom}$.

In this case, assuming that the tracking error covariance matrix after update is $P(+)$, the elements of $P(+)$ are given by the following equation (36).

$$P(+) = \begin{pmatrix} P(+)(1,1) & P(+)(1,2) & P(+)(1,3) & P(+)(1,4) & P(+)(1,5) & P(+)(1,6) \\ P(+)(2,1) & P(+)(2,2) & P(+)(2,3) & P(+)(2,4) & P(+)(2,5) & P(+)(2,6) \\ P(+)(3,1) & P(+)(3,2) & P(+)(3,3) & P(+)(3,4) & P(+)(3,5) & P(+)(3,6) \\ P(+)(4,1) & P(+)(4,2) & P(+)(4,3) & P(+)(4,4) & P(+)(4,5) & P(+)(4,6) \end{pmatrix} \quad (36)$$

The evaluation indices TrackDOPs for the tracking accuracy for the target can be calculated as shown in, for example, the following equations (37) to (43).

$$\text{TrackDOP1} = \text{sqrt}(P(+)(1,1) + P(+)(2,2) + P(+)(3,3)) / \sigma\Delta_{rnom} \quad (37)$$

$$\text{TrackDOP2} = \text{sqrt}(P(+)(1,1) + P(+)(2,2)) / \sigma\Delta_{rnom} \quad (38)$$

$$\text{TrackDOP3} = \text{sqrt}(P(+)(3,3)) / \sigma\Delta_{rnom} \quad (39)$$

$$\text{TrackDOP4} = \text{sqrt}(P(+)(4,4) + P(+)(5,5) + P(+)(6,6)) / \sigma\Delta_{rnom} \quad (40)$$

$$\text{TrackDOP5} = \text{sqrt}(P(+)(4,4) + P(+)(5,5)) / \sigma\Delta_{rnom} \quad (41)$$

$$\text{TrackDOP6} = \text{sqrt}(P(+)(6,6)) / \sigma\Delta_{rnom} \quad (42)$$

$$\text{TrackDOP7} = \text{sqrt}(P(+)(1,1) + P(+)(2,2) + P(+)(3,3)) / \sigma\Delta_{rnom} + \text{sqrt}(P(+)(4,4) + P(+)(5,5) + P(+)(6,6)) / \sigma\Delta_{rnom} \quad (43)$$

TrackDOP1 is the dilution of precision regarding the position, TrackDOP2 is the dilution of precision regarding the horizontal position, TrackDOP3 is the dilution of precision regarding the vertical position, TrackDOP4 is the dilution of precision regarding the velocity, TrackDOP5 is the dilution of precision regarding the horizontal speed, TrackDOP6 is the dilution of precision regarding the vertical speed, and TrackDOP7 is the dilution of precision including the whole of the position and the velocity.

The display processing unit 8 displays the evaluation indices DOPs for the positioning accuracy calculated by the DOP calculating unit 3 and the evaluation indices TrackDOPs for the tracking accuracy calculated by the TrackDOP calculating unit 7 on the display or the like.

FIG. 4 is an imaged figure showing an expected effect of the evaluation indices TrackDOPs for the tracking accuracy.

FIG. 4(a) is an imaged figure of each evaluation index DOP for the positioning accuracy, and the horizontal axis shows the observation points and the vertical axis shows DOP.

In the example shown in FIG. 4(a), the value of each DOP is calculated for each of the observation points 1 to 4, and the value of each DOP is shown by an error bar and the peaks of the error bars of the observation points are connected to each other.

Further, FIG. 4(b) is an imaged figure of each evaluation index TrackDOP for the tracking accuracy, and the horizontal axis shows the observation points and the vertical axis shows TrackDOP.

In the example shown in FIG. 4(b), the value of each TrackDOP is calculated for each of the observation points 1 to 4, and the value of each TrackDOP is shown by an error bar and the peaks of the error bars of the observation points are connected to each other.

The observation point 1 is the tracking start point Pstart.

Assuming that the evaluation is carried out for the observation point 4 shown in FIGS. 4(a) and 4(b), the observation point 4 is enclosed by a double line rectangle.

As shown in FIG. 4(a), the value of each DOP for the observation point 4 is bad because only one point which is the observation point 4 is used.

In contrast, as shown in FIG. 4(b), there is a possibility that the value of each TrackDOP for the observation point 4 decreases with respect to the value of each DOP.

This is because there is a possibility that the value of each TrackDOP for which a plurality of observation points are used decreases as compared with the value of each DOP for which one observation point is used.

Further, the values of TrackDOPs can be calculated for the observation point at the current time even if the minimum number of receiving stations required to estimate a measured position is not provided for the observation point at the current time. More specifically, because it is possible to calculate the tracking error covariance matrix at the current time from the tracking error covariance matrices for the observation points at times including up to the previous time even though the minimum number of receiving stations required to estimate a measured position is not provided for the observation point at the current time, the values of TrackDOPs for the observation point at the current time can be calculated.

Further, also when DOPs cannot be calculated because of an arrangement relationship between the receiving stations and the observation point at the current time even through the minimum number of receiving stations required to estimate a measured position is provided for the observation point at the current time, the values of TrackDOPs can be calculated similarly.

Although the example of acquiring the distance difference $r_i - r_0$ between the reference station and each of the receiving stations (1) to (3) to calculate the evaluation indices TrackDOPs for the tracking accuracy is shown in this Embodiment 1, by replacing the relational expressions of distance difference and position with relational expressions of distance and position in the equations (1) to (3), the evaluation indices TrackDOP for the tracking accuracy can be calculated similarly even when the observed values of the receiving stations (0) to (3) are the distances $r_i$.

Further, by replacing the relational expressions of distance difference and position with relational expressions of angle and position in the equations (1) to (3), the evaluation indices TrackDOP for the tracking accuracy can be calculated similarly even when the observed values of the receiving stations (0) to (3) are angles.

In addition, by replacing the relational expressions of distance difference and position with relational expressions of distance change ratio and position in the equations (1) to (3), the evaluation indices TrackDOP for the tracking accuracy can be calculated similarly even when the observed values of the receiving stations (0) to (3) are distance change ratios.

More specifically, by replacing the relational expressions of distance difference and position with relational expressions of an expected input to the system and position in the equations (1) to (3), the evaluation indices TrackDOP for the tracking accuracy in the case of the expected input to the system can be calculated.

As can be seen from the above description, the positioning and tracking device in accordance with this Embodiment 1 is constructed in such a way that the positioning and tracking device includes: the positioning error covariance matrix calculating unit 4 that calculates a positioning error covariance matrix $B_{pos}$ by using both a Jacobian matrix G calculated by the Jacobian matrix calculating unit 2 and a nominal observation error parameter $\sigma\Delta_{rnom}$, and calculates an initial value $P_{init}(+)$ of a tracking error covariance matrix $P_k(-)$ from the positioning error covariance matrices $B_{pos}(S)$ at first two observation points; the tracking error covariance matrix calculating unit 5 that calculates the tracking error covariance matrix $P_k(-)$ before update at a sampling time k by using the initial value $P_{init}(+)$ of the tracking error covariance matrix $P_k(-)$ calculated by the positioning error covariance matrix calculating unit 4; and the tracking error covariance matrix updating unit 6 that updates the tracking error covariance matrix $P_k(-)$ before update at the sampling time k calculated by the tracking error covariance matrix calculating unit 5 by using the nominal distance difference error parameter $\sigma\Delta_{rnom}$ at the current time, and outputs the tracking error covariance matrix $P_k(+)$ after update at the sampling time k, and the TrackDOP calculating unit 7 calculates evaluation indices TrackDOPs for the tracking accuracy for the target by using both the tracking error covariance matrix $P_k(+)$ after update at the sampling time k, and the nominal observation error parameter $\sigma\Delta_{rnom}$, there is provided an advantage of being able to present the evaluation indices TrackDOPs for the tracking accuracy for the target even in a situation in which the measurement of the target position and the calculation of the evaluation indices for the positioning accuracy cannot be carried out.

More specifically, there is provided an advantage of, even in a situation in which data missing occurs in the distances obtained through the positioning and a measured position is not calculated or DOPs cannot be calculated, being able to present the evaluation indices TrackDOPs for the tracking accuracy which are indices for estimation of the accuracy of a track which consists of a tracked position, a velocity, etc.

Embodiment 2

Figure 5:
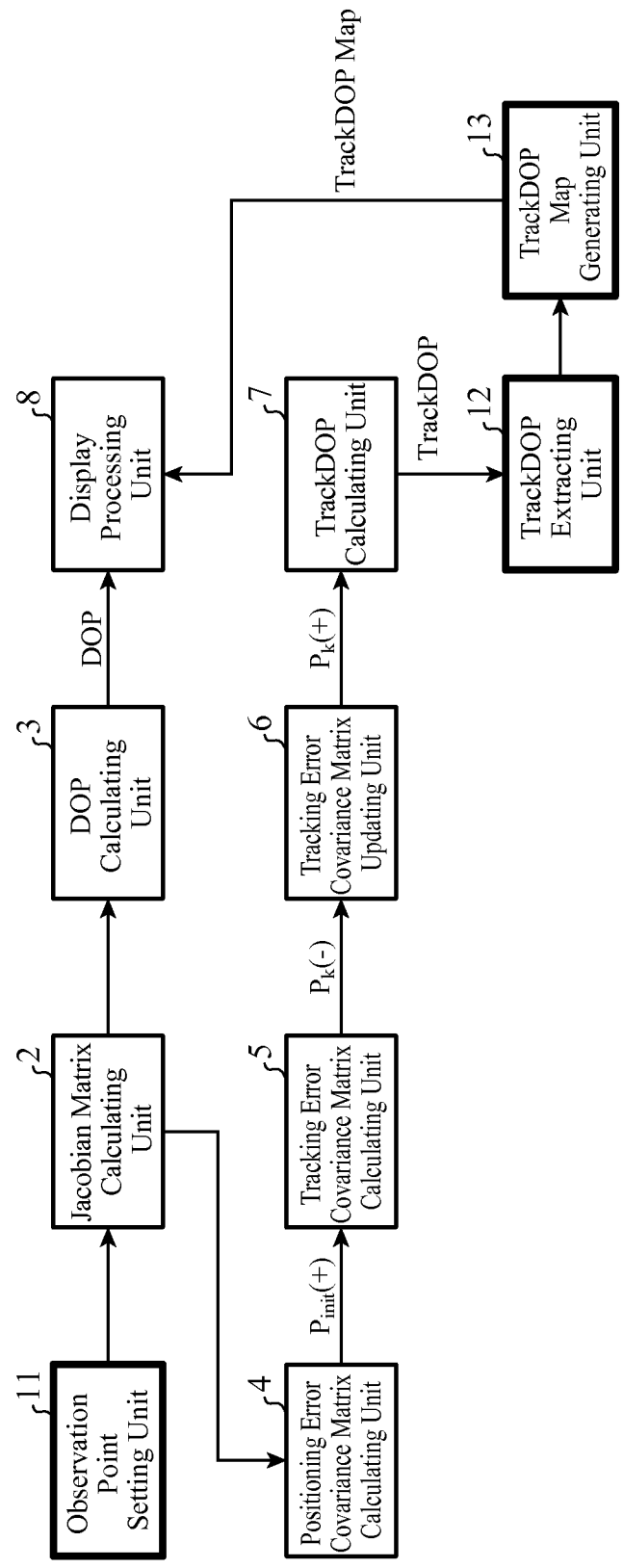
FIG. 5 is a structural diagram showing a positioning and tracking device in accordance with Embodiment 2 of the present invention.

FIG. 5 is a structural diagram showing a positioning and tracking device in accordance with Embodiment 2 of the present invention. In the figure, because the same reference numerals as those shown in FIG. 1 denote the same components or like components, the explanation of the components will be omitted hereafter.

Although an observation point setting unit 11 performs a process of setting up observation points leading from a tracking start point Pstart to a tracking end point Pend, like the observation point setting unit 1 shown in FIG. 1, this observation point setting unit 11 differs from the observation point setting unit 1 shown in FIG. 1 in that a plurality of tracking start points Pstart(s) are set up, and the observation point setting unit 11 sets up observation points leading from each of the plurality of tracking start points Pstart to the tracking end point Pend.

Therefore, in this Embodiment 2, processes from a process by a Jacobian matrix calculating unit 2 to a process by a TrackDOP calculating unit 7 are performed for each of the plurality of tracking start points Pstart(s).

As a result, when, for example, four tracking start points Pstart(s) are set up, and the number of observation points leading from each of the tracking start points Pstart (s) to the tracking endpoint Pend is N, 4×N evaluation indices Track-DOPs in total for tracking accuracy are calculated.

A TrackDOP extracting unit 12 performs a process of extracting the evaluation indices TrackDOPs for the tracking accuracy at the observation points on each of routes (routes leading from the plurality of tracking start points Pstart(s) to the tracking end point Pend respectively) for each of the routes from the evaluation indices TrackDOPs for the tracking accuracy which are calculated for the observation points on the routes by the TrackDOP calculating unit 7, and calculating a maximum, a minimum, and an average of the extracted evaluation indices TrackDOPs for the tracking accuracy.

A tracking accuracy evaluation index calculator is comprised of the TrackDOP calculating unit 7 and the TrackDOP extracting unit 12.

A TrackDOP map generating unit 13 performs a process of generating a TrackDOP map from the maximum, the minimum, and the average which are calculated by the TrackDOP extracting unit 12.

In the example shown in FIG. 5, it is assumed that each of the observation point setting unit 11, the Jacobian matrix calculating unit 2, a DOP calculating unit 3, a positioning error covariance matrix calculating unit 4, a tracking error covariance matrix calculating unit 5, a tracking error covariance matrix updating unit 6, the TrackDOP calculating unit 7, the TrackDOP extracting unit 12, the TrackDOP map generating unit 13, and a display processing unit 8, which are the components of the positioning and tracking device, consists of hardware for exclusive use (e.g., a semiconductor integrated circuit equipped with a CPU, or a one chip microcomputer). As an alternative, the positioning and tracking device can consist of a computer.

In the case in which the positioning and tracking device consists of a computer, a program which the processes carried out by the observation point setting unit 11, the Jacobian matrix calculating unit 2, the DOP calculating unit 3, the positioning error covariance matrix calculating unit 4, the tracking error covariance matrix calculating unit 5, the tracking error covariance matrix updating unit 6, the TrackDOP calculating unit 7, the TrackDOP extracting unit 12, the TrackDOP map generating unit 13, and the display processing unit 8 are described can be stored in a memory of the computer, and a CPU of the computer can be made to execute the program stored in the memory.

Next, the operation of the positioning and tracking device will be explained.

The observation point setting unit 11 sets up a tracking end point Pend which is an observation point where the tracking of a target will be ended, like the observation point setting unit 1 shown in FIG. 1.

After setting up the tracking end point Pend, the observation point setting unit 11 calculates a tracking start point Pstart of the target by using the tracking end point Pend, a sampling Ta, a velocity vector Va of the target, and the number Na of observation points, thereby setting up observation points leading from the tracking start point Pstart to the tracking end point Pend, like the observation point setting unit 1 shown in FIG. 1. In addition, in this Embodiment 2, as shown in FIG. 6, a case in which a plurality of tracking start points Pstart (s) are set up, and observation points leading from each of the plurality of tracking start points Pstart (s) to the tracking end point Pend are set up is assumed.

Figure 6:
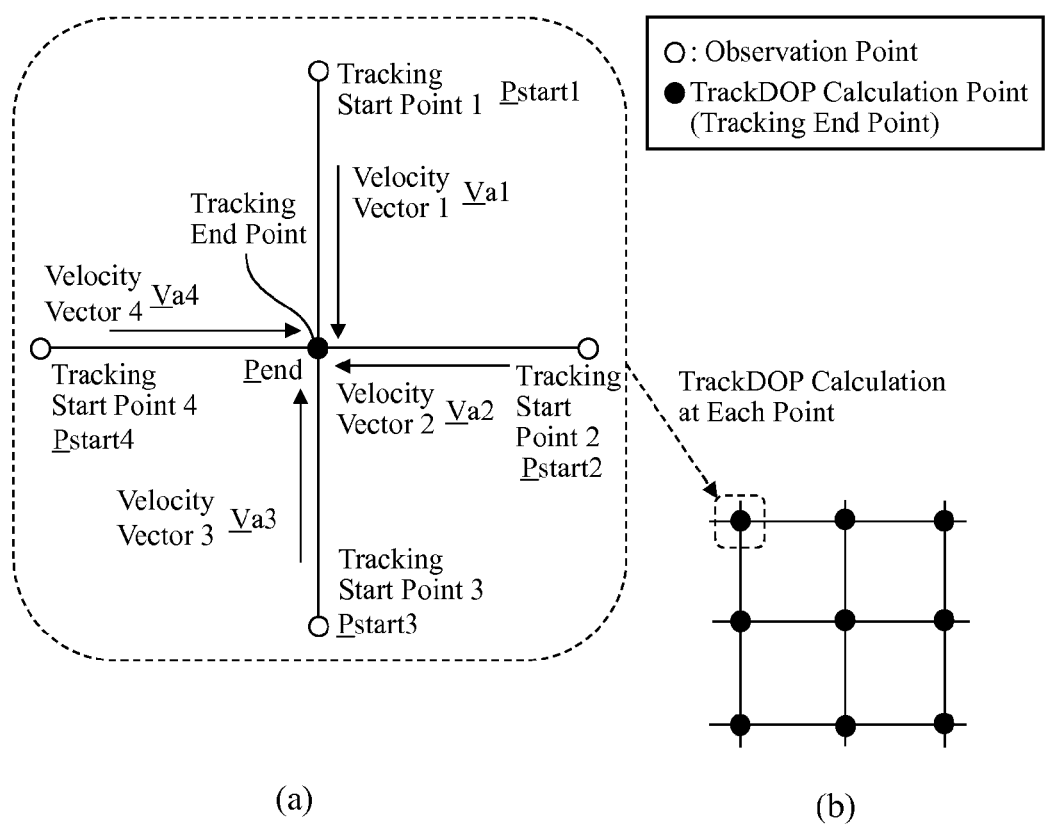
FIG. 6 is an explanatory drawing showing that the evaluation indices TrackDOPs for the tracking accuracy are calculated for each of observation points leading from each of a plurality of tracking start points Pstart to a tracking end point Pend.

FIG. 6 is an explanatory drawing showing that an evaluation index TrackDOP for the tracking accuracy is calculated for each of the observation points leading from each of the plurality of tracking start points Pstart (s) to the tracking end point Pend.

More specifically, after setting up the tracking end point Pend, the observation point setting unit 11 calculates four tracking start points Pstart1 to Pstart4 of the target by using, as parameters, the tracking end point Pend, the sampling Ta, four velocity vectors Va1 to Va4 of the target, and the number Na of observation points (refer to equation (23)), thereby setting up observation points leading from each of the four tracking start points Pstart1 to Pstart4 to the tracking end point Pend.

In FIG. 6(a), although the example in which the four tracking start points are set up is shown, the number of tracking start points is not limited to four, and can be n (n is an integer equal to or larger than 1).

After setting up the observation points leading from each of the four tracking start points Pstart1 to Pstart4 to the tracking end point Pend, the observation point setting unit 11 arranges the observation points on a grid, as shown in FIG. 6 (b), and, for each of the observation points, outputs a combination of the tracking start point Pstart, the tracking end point Pend, the sampling Ta, the velocity vector Va, and the number Na of observation points.

Although a detailed explanation of the processes from the process by the Jacobian matrix calculating unit 2 to the process by the TrackDOP calculating unit 7 is omitted because the processes are the same as those in accordance with above-mentioned Embodiment 1, in this Embodiment 2, an evaluation index TrackDOP for the tracking accuracy is calculated for each of the observation points leading from each of the plurality of tracking start points Pstart(s) to the tracking end point Pend because the plurality of tracking start points Pstart(s) are set up.

The TrackDOP extracting unit 12 extracts the evaluation indices TrackDOPs for the tracking accuracy at the observation points on each of the routes (the routes leading from the plurality of tracking start points Pstart(s) to the tracking end point Pend respectively) for each of the routes from among the evaluation indices TrackDOPs for the tracking accuracy which are calculated for the observation points on the routes by the TrackDOP calculating unit 7, and calculates the maximum, the minimum, and the average of the extracted evaluation indices TrackDOPs for the tracking accuracy.

After the TrackDOP extracting unit 12 calculates the maximum, the minimum, and the average of the evaluation indices TrackDOPs for the tracking accuracy for each of the routes, the TrackDOP map generating unit 13 generates a TrackDOP map from the maximum, the minimum, and the average.

The display processing unit 8 displays the TrackDOP map generated by the TrackDOP map generating unit 13 on a display or the like.

Figure 7:
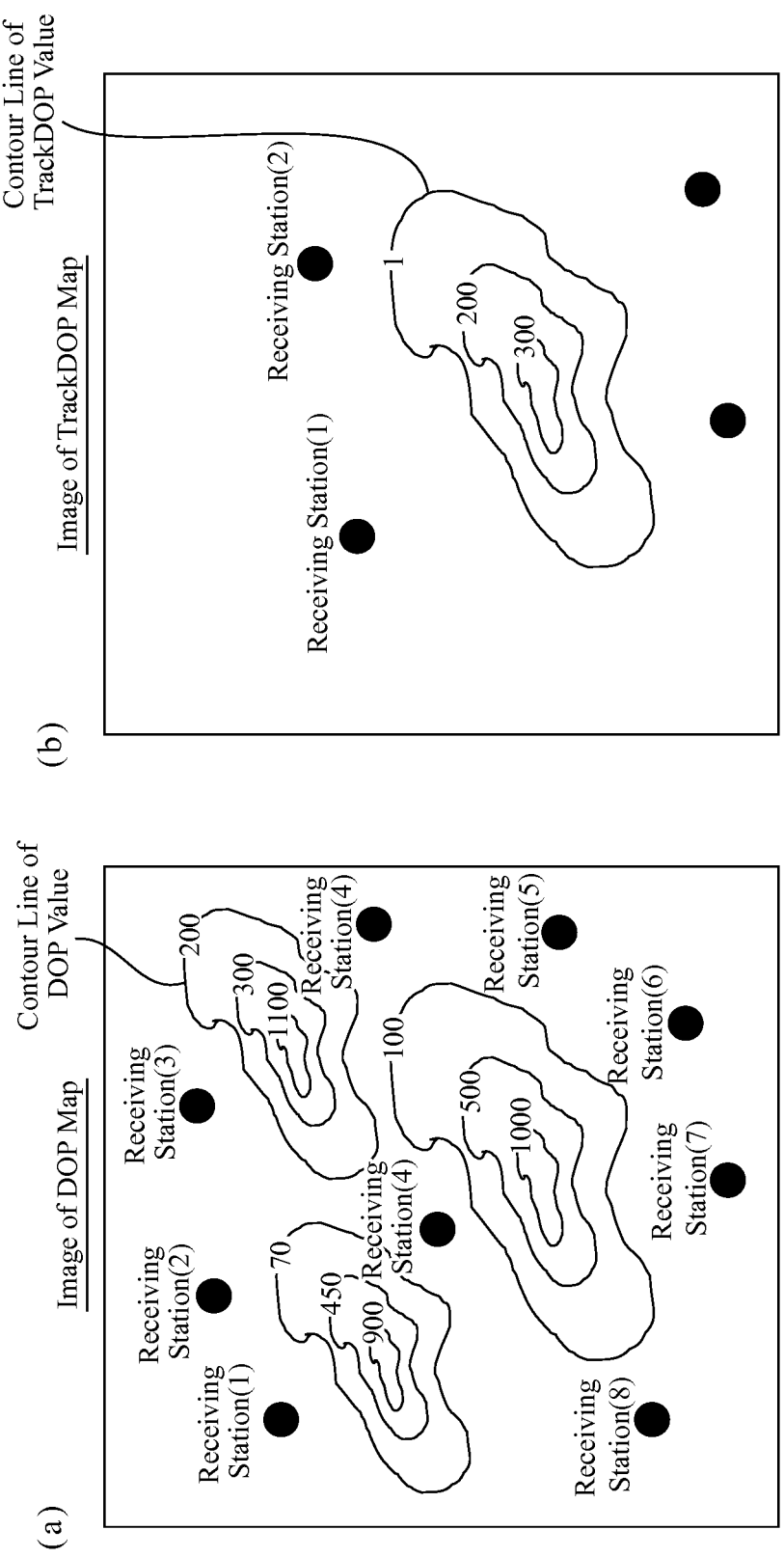
FIG. 7 is an imaged figure showing an example of a TrackDOP map.

FIG. 7 is an imaged view showing an example of the TrackDOP map.

FIG. 7(a) shows an image of a DOP map which is generated by calculating a DOP at each grid point, and each black circle ● shows a receiving station, each numeral shows a DOP value, and a line shown below each numeral shows a contour line of a DOP value.

In the example shown in FIG. 7(a), there are three groups of contour lines, and, in order to lower the peak of each of these contour line groups (the maximum of the DOP values), for example, the receiving stations need to be arranged and the number of receiving stations needs to be determined in such a way that the contour lines are enclosed by the receiving stations.

In contrast with this, in the TrackDOP map shown in FIG. 7(b), the peak of the contour lines decreases as compared with those of the DOP map, and the number of receiving stations for lowering the peak of the contour lines is small as compared with that of the DOP map.

Thus, the TrackDOP map is the dilutions of precision on which a tracking process has been performed by using the plurality of observation points. While the DOP map is the dilution of precision at one observation point from the viewpoint of a reduction of the dilution of precision for the tracking of a final output to an operator, a minimum number of receiving stations can be allocated as the number of receiving stations from the viewpoint of a reduction in tracking errors.

By displaying the TrackDOP map, the display processing unit 8 can geographically show the dilutions of precision on which the tracking process has been performed from the viewpoint of a reduction in the dilutions of precision for the tracking of a final output to an operator. Therefore, a minimum number of receiving stations can be allocated as the number of receiving stations from the viewpoint of a reduction in tracking errors.

Embodiment 3

Figure 8:
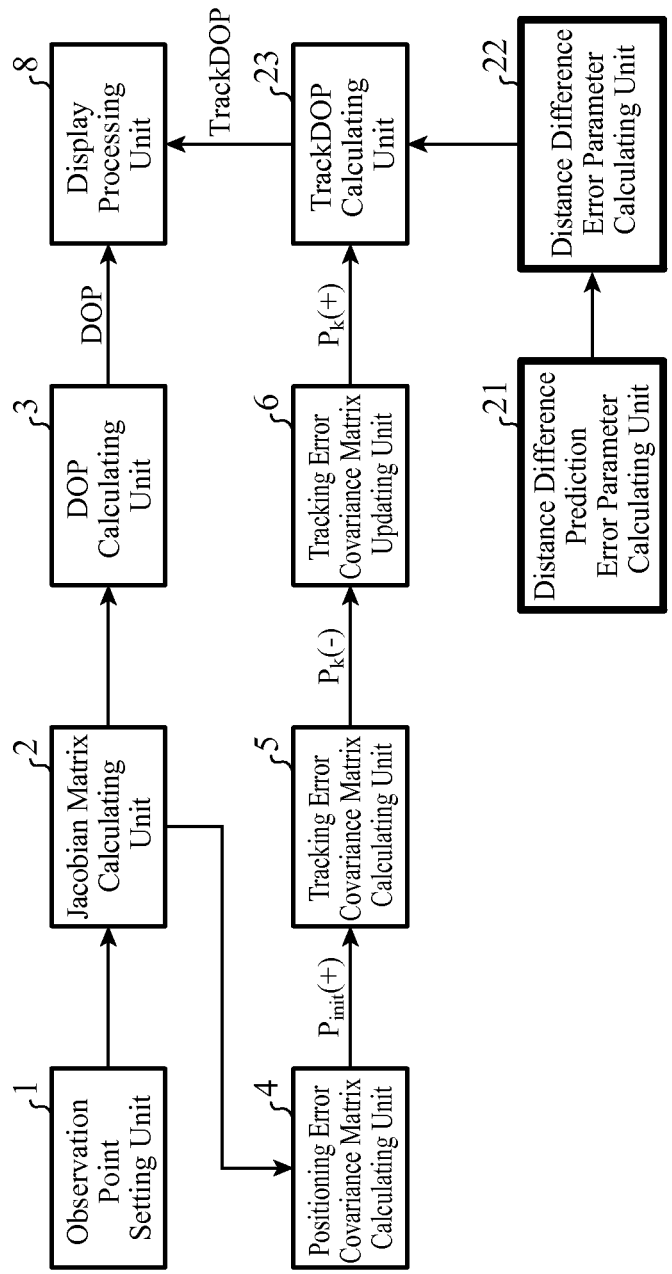
FIG. 8 is a structural diagram showing a positioning and tracking device in accordance with Embodiment 3 of the present invention.

FIG. 8 is a structural diagram showing a positioning and tracking device in accordance with Embodiment 3 of the present invention. In the figure, because the same reference numerals as those shown in FIG. 1 denote the same components or like components, the explanation of the components will be omitted hereafter.

A distance difference prediction error parameter calculating unit 21 performs a process of, from a predicted position error $\Delta L_p$ which is set up in advance by a user in consideration of a movement of a target and an all-receiving-stations Jacobian matrix G calculated by a Jacobian matrix calculating unit 2, calculating a distance difference prediction error parameter $\sigma \Delta r_p$ which is a one in distance difference space into which the predicted position error $\Delta L_p$ is transformed.

A distance difference error parameter calculating unit 22 performs a process of calculating a new nominal observation error parameter $\sigma \Delta_{rnom1}$ by using both the distance difference prediction error parameter $\sigma \Delta r_p$ calculated by the distance difference prediction error parameter calculating unit 21, and a preset nominal observation error parameter $\sigma \Delta_{rnom}$.

A TrackDOP calculating unit 23 performs a process of calculating an evaluation index TrackDOP for tracking accuracy for the target by using both a tracking error covariance matrix $P_k(+)$ after update, which is outputted from a tracking error covariance matrix updating unit 6, and the nominal observation error parameter $\sigma \Delta_{rnom1}$ calculated by the distance difference error parameter calculating unit 22.

A tracking accuracy evaluation index calculator is comprised of the distance difference prediction error parameter calculating unit 21, the distance difference error parameter calculating unit 22, and the TrackDOP calculating unit 23.

In the example shown in FIG. 8, it is assumed that each of an observation point setting unit 1, the Jacobian matrix calculating unit 2, a DOP calculating unit 3, a positioning error covariance matrix calculating unit 4, a tracking error covariance matrix calculating unit 5, a tracking error covariance matrix updating unit 6, the distance difference prediction error parameter calculating unit 21, the distance difference error parameter calculating unit 22, the TrackDOP calculating unit 23, and a display processing unit 8, which are the components of the positioning and tracking device, consists of hardware for exclusive use (e.g., a semiconductor integrated circuit equipped with a CPU, or a one chip microcomputer). As an alternative, the positioning and tracking device can consist of a computer.

In the case in which the positioning and tracking device consists of a computer, a program which the processes carried out by the observation point setting unit 1, the Jacobian matrix calculating unit 2, the DOP calculating unit 3, the positioning error covariance matrix calculating unit 4, the tracking error covariance matrix calculating unit 5, the tracking error covariance matrix updating unit 6, the distance difference prediction error parameter calculating unit 21, the distance difference error parameter calculating unit 22, the TrackDOP calculating unit 23, and the display processing unit 8 are described can be stored in a memory of the computer, and a CPU of the computer can be made to execute the program stored in the memory.

Next, the operation of the positioning and tracking device will be explained.

Although the example in which the TrackDOP calculating unit 7 calculates an evaluation index TrackDOP for the tracking accuracy for the target by using the preset nominal observation error parameter $\sigma \Delta_{rnom}$ is shown in above-mentioned Embodiment 1, the TrackDOP calculating unit 7 can alternatively calculate a distance difference prediction error parameter $\sigma \Delta r_p$ by using a predicted position error $\Delta L_p$ in which a movement of the target is taken into consideration, and can also calculate a new nominal observation error parameter $\sigma \Delta_{rnom1}$ by using both the distance difference prediction error parameter $\sigma\Delta r_p$ and the preset nominal observation error parameter $\sigma\Delta_{rnom}$ and calculate an evaluation index TrackDOP for the tracking accuracy for the target by using the new nominal observation error parameter $\sigma\Delta_{rnom1}$.

In this case, because the TrackDOP calculating unit uses not only noise occurring in each receiving station but also the nominal observation error parameter $\sigma\Delta_{rnom1}$ in which a movement of the target is taken into consideration, the evaluation index TrackDOP for the tracking accuracy can be calculated with a higher degree of accuracy as compared with that in above-mentioned Embodiment 1.

Hereafter, the details of processing in accordance with this Embodiment 3 will be explained concretely.

However, because processes other than those performed by the distance difference prediction error parameter calculating unit 21, the distance difference error parameter calculating unit 22, and the TrackDOP calculating unit 23 are the same as those in above-mentioned Embodiment 1, only the details of the processes performed by the distance difference prediction error parameter calculating unit 21, the distance difference error parameter calculating unit 22, and the TrackDOP calculating unit 23 will be explained hereafter.

From the predicted position error $\Delta L_p$ which is set up in advance by a user in consideration of a movement of the target and the all-receiving-stations Jacobian matrix G calculated by the Jacobian matrix calculating unit 2, the distance difference prediction error parameter calculating unit 21 calculates a distance difference prediction error parameter $\sigma\Delta r_p$ which is a one in distance difference space into which the predicted position error $\Delta L_p$ is transformed, as shown in the following equation (44).

$$\sigma\Delta r_p = \mathrm{sqrt}(G \times G^T) \times \Delta L_p \qquad (44)$$

In the equation (14) for calculating the all-receiving-stations Jacobian matrix G, although the casein which the number of receiving stations is four is shown, the size of the all-receiving-stations Jacobian matrix G can be changed according to the order of the position to be estimated and the number of receiving stations.

After the distance difference prediction error parameter calculating unit 21 calculates the distance difference prediction error parameter $\sigma\Delta r_p$, the distance difference error parameter calculating unit 22 calculates a new nominal observation error parameter $\sigma\Delta_{rnom1}$ by using both the distance difference prediction error parameter $\sigma\Delta r_p$ and the preset nominal observation error parameter $\sigma\Delta_{rnom}$ (the nominal observation error parameter used in Embodiment 1), as shown in the following equation (45).

$$(\sigma\Delta_{rnom1})^2 = (\sigma\Delta_{rnom})^2 + (\sigma\Delta r_p)^2 \qquad (45)$$

After the distance difference error parameter calculating unit 22 calculates the new nominal observation error parameter $\sigma\Delta_{rnom1}$, the TrackDOP calculating unit 23 calculates an evaluation index TrackDOP for the tracking accuracy for the target by using both the tracking error covariance matrix $P_k(+)$ after update outputted from the tracking error covariance matrix updating unit 6 and the new nominal observation error parameter $\sigma\Delta_{rnom1}$.

Although the process of calculating the evaluation index TrackDOP for the tracking accuracy is the same as that performed by the TrackDOP calculating unit 7 shown in FIG. 1, the evaluation index TrackDOP for the tracking accuracy in which a prediction error for the target is reflected can be calculated because the new nominal observation error parameter $\sigma\Delta_{rnom1}$ is used.

Embodiment 4

Figure 9:
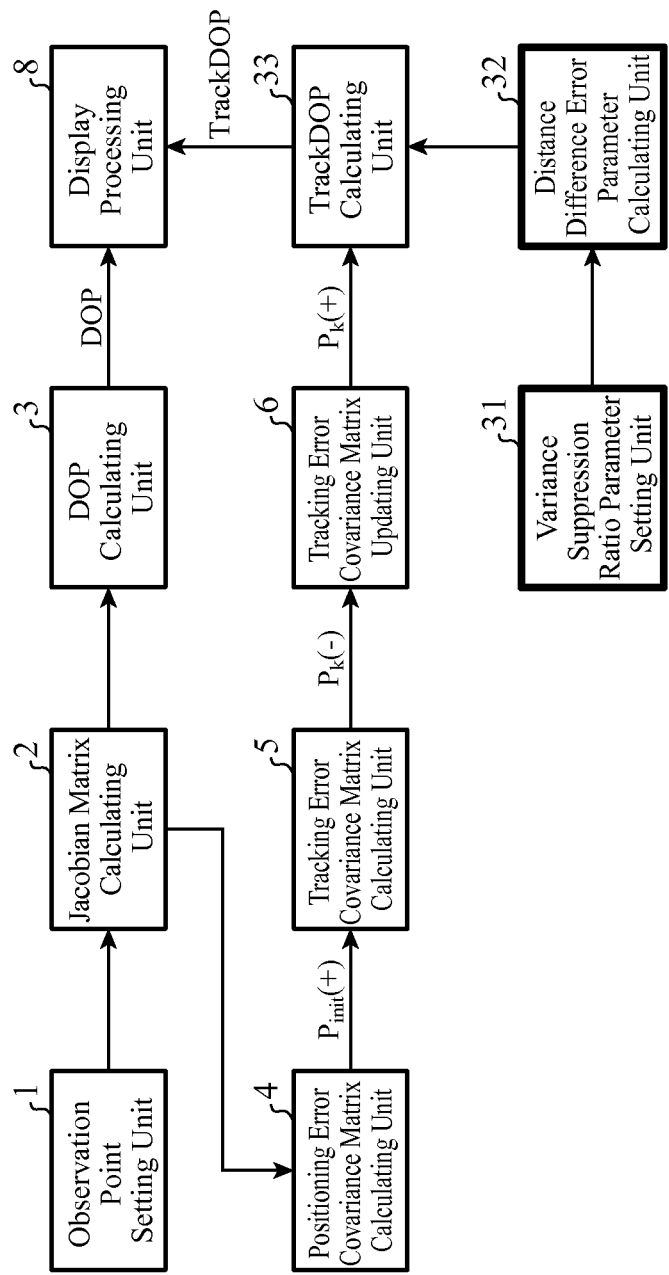
FIG. 9 is a structural diagram showing a positioning and tracking device in accordance with Embodiment 4 of the present invention.

FIG. 9 is a structural diagram showing a positioning and tracking device in accordance with Embodiment 4 of the present invention. In the figure, because the same reference numerals as those shown in FIG. 1 denote the same components or like components, the explanation of the components will be omitted hereafter.

A variance suppression ratio parameter setting unit 31 performs a process of setting up a variance suppression ratio parameter $\alpha$ which is a ratio of a distance difference observation error variance (corresponding to the nominal observation error parameter $\sigma\Delta_{rnom}$ which is used in Embodiment 1) to a distance difference prediction error variance (corresponding to the distance difference prediction error parameter $\sigma\Delta r_p$ calculated in Embodiment 2).

A distance difference error parameter calculating unit 32 performs a process of calculating a new nominal observation error parameter $\sigma\Delta_{rnom2}$ by using both the variance suppression ratio parameter $\alpha$, which is set up by the variance suppression ratio parameter setting unit 31, and a preset nominal observation error parameter $\sigma\Delta_{rnom}$ (the nominal observation error parameter used in Embodiment 1).

A TrackDOP calculating unit 33 performs a process of calculating an evaluation index TrackDOP for tracking accuracy for a target by using both a tracking error covariance matrix $P_k(+)$ after update outputted from a tracking error covariance matrix updating unit 6, and the nominal observation error parameter $\sigma\Delta_{rnom2}$ calculated by the distance difference error parameter calculating unit 32.

A tracking accuracy evaluation index calculator is comprised of the variance suppression ratio parameter setting unit 31, the distance difference error parameter calculating unit 32, and the TrackDOP calculating unit 33.

In the example shown in FIG. 9, it is assumed that each of an observation point setting unit 1, a Jacobian matrix calculating unit 2, a DOP calculating unit 3, a positioning error covariance matrix calculating unit 4, a tracking error covariance matrix calculating unit 5, the tracking error covariance matrix updating unit 6, the variance suppression ratio parameter setting unit 31, the distance difference error parameter calculating unit 32, the TrackDOP calculating unit 33, and a display processing unit 8, which are the components of the positioning and tracking device, consists of hardware for exclusive use (e.g., a semiconductor integrated circuit equipped with a CPU, or a one chip microcomputer). As an alternative, the positioning and tracking device can consist of a computer.

In the case in which the positioning and tracking device consists of a computer, a program which the processes carried out by the observation point setting unit 1, the Jacobian matrix calculating unit 2, the DOP calculating unit 3, the positioning error covariance matrix calculating unit 4, the tracking error covariance matrix calculating unit 5, the tracking error covariance matrix updating unit 6, the variance suppression ratio parameter setting unit 31, the distance difference error parameter calculating unit 32, the TrackDOP calculating unit 33, and the display processing unit 8 are described can be stored in a memory of the computer, and a CPU of the computer can be made to execute the program stored in the memory.

Next, the operation of the positioning and tracking device will be explained.

Although the example in which the TrackDOP calculating unit 7 calculates an evaluation index TrackDOP for the tracking accuracy for the target by using the preset nominal observation error parameter $\sigma\Delta_{rnom}$ is shown in above-mentioned Embodiment 1, the TrackDOP calculating unit 7 can alternatively calculate a new nominal observation error parameter $\sigma\Delta_{rnom2}$ by using the variance suppression ratio parameter $\alpha$ in which a movement of the target is taken into consideration, and calculate an evaluation index TrackDOP for the tracking accuracy for the target by using the new nominal observation error parameter $\sigma\Delta_{rnom2}$.

In this case, because the TrackDOP calculating unit uses not only noise occurring each receiving station but also the nominal observation error parameter $\sigma\Delta_{rnom2}$ in which a movement of the target is taken into consideration, the evaluation index TrackDOP for the tracking accuracy can be calculated with a higher degree of accuracy as compared with that in above-mentioned Embodiment 1.

Hereafter, the details of processing in accordance with this Embodiment 4 will be explained concretely.

However, because processes other than those performed by the variance suppression ratio parameter setting unit 31, the distance difference error parameter calculating unit 32, and the TrackDOP calculating unit 33 are the same as those in above-mentioned Embodiment 1, only the details of the processes performed by the variance suppression ratio parameter setting unit 31, the distance difference error parameter calculating unit 32, and the TrackDOP calculating unit 33 will be explained hereafter.

The variance suppression ratio parameter setting unit 31 sets up a variance suppression ratio parameter $\alpha$ which is a ratio of a distance difference observation error variance corresponding to the nominal observation error parameter $\sigma\Delta_{rnom}$ used in above-mentioned Embodiment 1 to a distance difference prediction error variance corresponding to the distance difference prediction error parameter $\sigma\Delta r_p$ calculated in above-mentioned Embodiment 2, as shown in the following equation (46).

$$\alpha = (\sigma\Delta_{rnom})^2 / (\sigma\Delta r_p)^2 \quad (46)$$

Although the equation (46) is shown explicitly in order to explain the variance suppression ratio parameter $\alpha$, the variance suppression ratio parameter setting unit 31 is intended to set up the variance suppression ratio parameter $\alpha$, but not to calculate the equation (46).

After the variance suppression ratio parameter setting unit 31 sets up the variance suppression ratio parameter $\alpha$, the distance difference error parameter calculating unit 32 calculates a new nominal observation error parameter $\sigma\Delta_{rnom2}$ by using both the variance suppression ratio parameter $\alpha$ and a preset nominal observation error parameter $\sigma\Delta_{rnom}$ (the nominal observation error parameter used in Embodiment 1), as shown in the following equation (47).

$$(\sigma\Delta_{rnom2})^2 = (1+\alpha)(\sigma\Delta_{rnom})^2 \quad (47)$$

After the distance difference error parameter calculating unit 32 calculates the new nominal observation error parameter $\sigma\Delta_{rnom2}$ the TrackDOP calculating unit 33 calculates an evaluation index TrackDOP for the tracking accuracy for the target by using both a tracking error covariance matrix $P_k(+)$ after update, which is outputted from the tracking error covariance matrix updating unit 6, and the new nominal observation error parameter $\sigma\Delta_{rnom2}$.

Although the process of calculating the evaluation index TrackDOP for the tracking accuracy is the same as that performed by the TrackDOP calculating unit 7 shown in FIG. 1, the evaluation index TrackDOP for the tracking accuracy in which a prediction error for the target is reflected can be calculated because the new nominal observation error parameter $\sigma\Delta_{rnom2}$ is used.

Further, the parameter setting becomes easier as compared with that in the calculation of the distance difference prediction error parameter $\sigma\Delta r_p$ in above-mentioned Embodiment 3.

Embodiment 5

Figure 10:
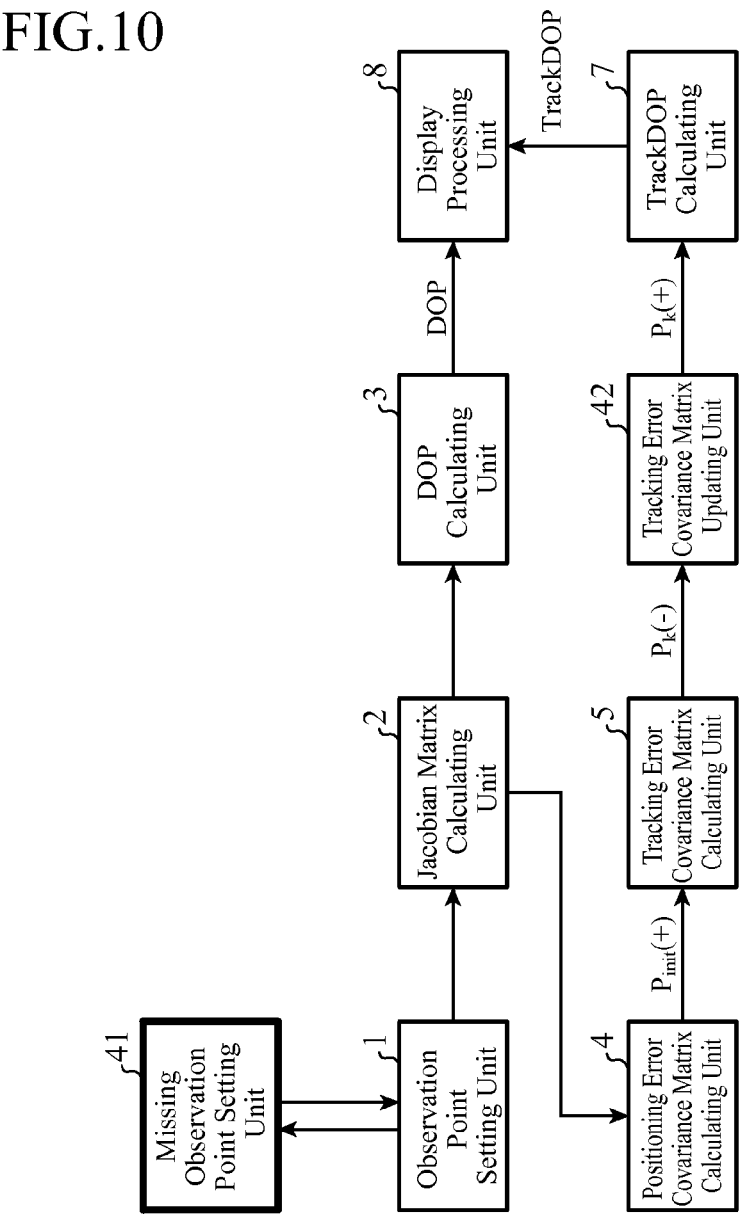
FIG. 10 is a structural diagram showing a positioning and tracking device in accordance with Embodiment 5 of the present invention.

FIG. 10 is a structural diagram showing a positioning and tracking device in accordance with Embodiment 5 of the present invention. In the figure, because the same reference numerals as those shown in FIG. 1 denote the same components or like components, the explanation of the components will be omitted hereafter.

A missing observation point setting unit 41 performs a process of setting up a missing observation point for which a distance difference (observed value) cannot be acquired by a Jacobian matrix calculating unit 2 from among observation points leading from a tracking start point Pstart of a target to a tracking end point Pend of the target. The missing observation point setting unit 41 constructs a missing observation point setter.

While a tracking error covariance matrix updating unit 42 performs a process of updating a tracking error covariance matrix $P_k(-)$ calculated by a tracking error covariance matrix calculating unit 5 by using a nominal observation error parameter $\sigma\Delta_{rnom}$, and outputting a tracking error covariance matrix $P_k(+)$ after update to a TrackDOP calculating unit 7, like the tracking error covariance matrix updating unit 6 shown in FIG. 1, the tracking error covariance matrix updating unit performs a process of, for the missing observation point set up by the missing observation point setting unit 41, outputting the tracking error covariance matrix $P_k(-)$ calculated by the tracking error covariance matrix calculating unit 5 to the TrackDOP calculating unit 7 as the tracking error covariance matrix $P_k(+)$ after update without updating the tracking error covariance matrix $P_k(-)$. The tracking error covariance matrix updating unit 42 constructs a tracking error covariance matrix updater.

In the example shown in FIG. 10, it is assumed that each of the missing observation point setting unit 41, an observation point setting unit 1, the Jacobian matrix calculating unit 2, a DOP calculating unit 3, a positioning error covariance matrix calculating unit 4, a tracking error covariance matrix calculating unit 5, the tracking error covariance matrix updating unit 42, the TrackDOP calculating unit 7, and a display processing unit 8, which are the components of the positioning and tracking device, consists of hardware for exclusive use (e.g., a semiconductor integrated circuit equipped with a CPU, or a one chip microcomputer). As an alternative, the positioning and tracking device can consist of a computer. In the case in which the positioning and tracking device consists of a computer, a program which the processes carried out by the missing observation point setting unit 41, the observation point setting unit 1, the Jacobian matrix calculating unit 2, the DOP calculating unit 3, the positioning error covariance matrix calculating unit 4, the tracking error covariance matrix calculating unit 5, the tracking error covariance matrix updating unit 42, the TrackDOP calculating unit 7, and the display processing unit 8 are described can be stored in a memory of the computer, and a CPU of the computer can be made to execute the program stored in the memory.

Next, the operation of the positioning and tracking device will be explained.

However, because processes other than those performed by the missing observation point setting unit 41 and the tracking error covariance matrix updating unit 42 are the same as those in above-mentioned Embodiment 1, only the details of the processes performed by the missing observation point setting unit 41 and the tracking error covariance matrix updating unit 42 will be explained hereafter.

The missing observation point setting unit 41 sets up missing observation points for each of which a distance difference (observed value) cannot be acquired by the Jacobian matrix calculating unit 2 from among the observation points leading from the tracking start point Pstart of the target to the tracking end point Pend of the target.

Figure 11:
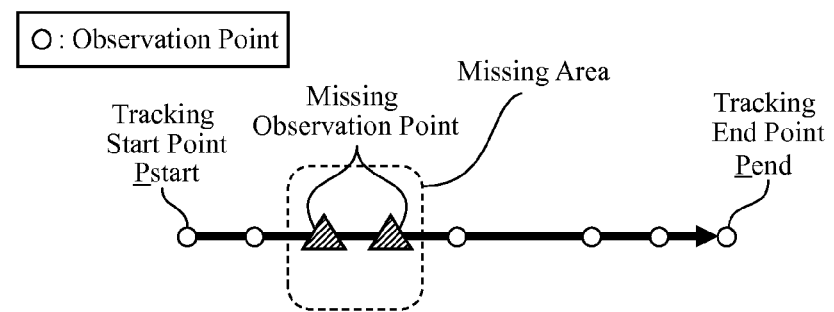
FIG. 11 is an explanatory drawing showing a missing observation point set up by a missing observation point setting unit 41.

FIG. 11 is an explanatory drawing showing the missing observation points set up by the missing observation point setting unit 41. In the example shown in FIG. 11, each observation point marked with ▲ is a missing observation point.

The missing observation point setting unit 41 determines whether or not each observation point set up by the observation point setting unit 41 is a missing observation point, and, when the observation point is a missing observation point, notifies the tracking error covariance matrix updating unit 42 that the observation point is a missing observation point by way of the observation point setting unit 41.

When the observation point is not a missing observation point, the tracking error covariance matrix updating unit 42 updates the tracking error covariance matrix $P_k(-)$ calculated by the tracking error covariance matrix calculating unit 5 by using the nominal observation error parameter $\sigma\Delta_{mom}$ and outputs the tracking error covariance matrix $P_k(+)$ after update to the TrackDOP calculating unit 7, like the tracking error covariance matrix updating unit 6 shown in FIG. 1.

In contrast, when the observation point is a missing observation point, the tracking error covariance matrix updating unit outputs the tracking error covariance matrix $P_k(-)$ calculated by the tracking error covariance matrix calculating unit 5 to the TrackDOP calculating unit 7 as the tracking error covariance matrix $P_k(+)$ after update without updating the tracking error covariance matrix $P_k(-)$, as shown in the following equation (48).

$$P_k(+)=P_k(-) \qquad (48)$$

As can be seen from the above description, the positioning and tracking device in accordance with this Embodiment 5 is constructed in such a way that the positioning and tracking device includes the missing observation point setting unit 41 that sets up a missing observation point for which a distance difference (observed value) cannot be acquired by the Jacobian matrix calculating unit 2 from among the observation points leading from the tracking start point Pstart of the target to the tracking end point Pend of the target, and the tracking error covariance matrix updating unit 42 updates the tracking error covariance matrix $P_k(-)$ calculated by the tracking error covariance matrix calculating unit 5 by using the nominal observation error parameter $\sigma\Delta_{mom}$, and, when outputting the tracking error covariance matrix $P_k(+)$ after update to the TrackDOP calculating unit 7, for the missing observation point set up by the missing observation point setting unit 41, outputs the tracking error covariance matrix $P_k(-)$ calculated by the tracking error covariance matrix calculating unit 5 to the TrackDOP calculating unit 7 as the tracking error covariance matrix $P_k(+)$ after update without updating the tracking error covariance matrix $P_k(-)$. Therefore, there is provided an advantage of, even when it is expected that an observed value is missing for reasons of blocking by obstacles, such as buildings or mountains, and a failure occurring in a receiving station, being able to calculate the evaluation index Track-DOP for the tracking accuracy for the target.

Embodiment 6

Figure 12:
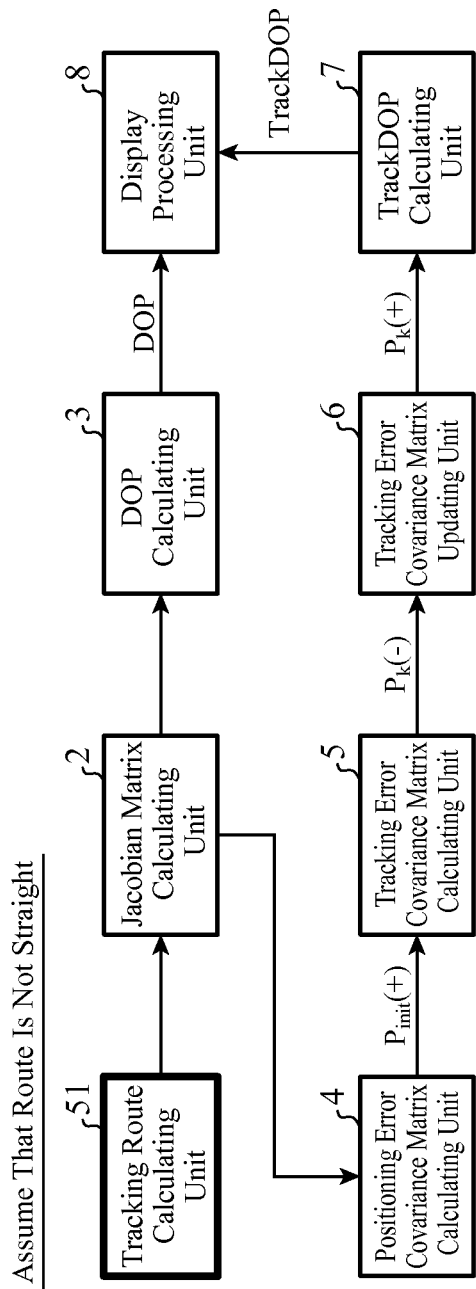
FIG. 12 is a structural diagram showing a positioning and tracking device in accordance with Embodiment 6 of the present invention.

FIG. 12 is a structural diagram showing a positioning and tracking device in accordance with Embodiment 6 of the present invention. In the figure, because the same reference numerals as those shown in FIG. 1 denote the same components or like components, the explanation of the components will be omitted hereafter.

A tracking route calculating unit 51 performs a process of calculating a tracking route for a target and setting up observation points on the tracking route (observation points leading from a tracking start point Pstart to a tracking end point Pend).

In the example shown in FIG. 12, it is assumed that each of the tracking route calculating unit 51, a Jacobian matrix calculating unit 2, a DOP calculating unit 3, a positioning error covariance matrix calculating unit 4, a tracking error covariance matrix calculating unit 5, a tracking error covariance matrix updating unit 6, a TrackDOP calculating unit 7, and a display processing unit 8, which are the components of the positioning and tracking device, consists of hardware for exclusive use (e.g., a semiconductor integrated circuit equipped with a CPU, or a one chip microcomputer). As an alternative, the positioning and tracking device can consist of a computer.

In the case in which the positioning and tracking device consists of a computer, a program which the processes carried out by the tracking route calculating unit 51, the Jacobian matrix calculating unit 2, the DOP calculating unit 3, the positioning error covariance matrix calculating unit 4, the tracking error covariance matrix calculating unit 5, the tracking error covariance matrix updating unit 6, the TrackDOP calculating unit 7, and the display processing unit 8 are described can be stored in a memory of the computer, and a CPU of the computer can be made to execute the program stored in the memory.

Next, the operation of the positioning and tracking device will be explained.

This Embodiment 6 differs from above-mentioned Embodiment 1 in that the tracking route calculating unit 51 is disposed instead of the observation point setting unit 1.

Figure 13:
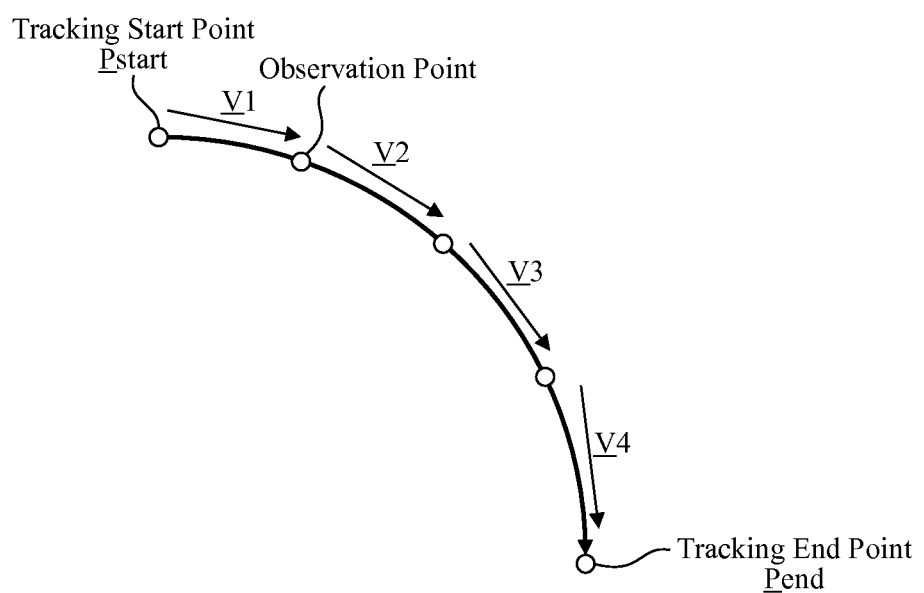
FIG. 13 is an explanatory drawing showing observation points set up on a tracking route which is not straight.

FIG. 13 is an explanatory drawing showing observation points set up on a tracking route which is not straight.

When setting up observation points leading from the tracking start point Pstart to the tracking endpoint Pend, the tracking route calculating unit 51 finely sets up velocity vectors each connecting between observation points, like V1, V2, V3, and V4, as shown in FIG. 13, thereby being able to set up not only a straight tracking route, but also a tracking route which is not straight.

For example, when an obstacle, such as a building, a mountain, or a cloud, exists, the tracking route calculating unit sets up a tracking route which is not straight in order to avoid the influence of blocking by the obstacle.

After setting up the tracking route, the tracking route calculating unit 51 sets up observation points on the tracking route (observation points leading from the tracking start point Pstart to the tracking end point Pend). A method of setting up observation points is the same as that which the observation point setting unit 1 shown in FIG. 1 uses.

Because the details of processes performed by processing units other than the tracking route calculating unit 51 are the same as those shown in above-mentioned Embodiment 1, the explanation of the processes will be omitted hereafter.

In accordance with this Embodiment 6, there is provided an advantage of being able to avoid the influence of an obstacle, such as a mountain or a cloud, and calculate an evaluation index TrackDOP for tracking accuracy for the target.

Embodiment 7

Figure 14:
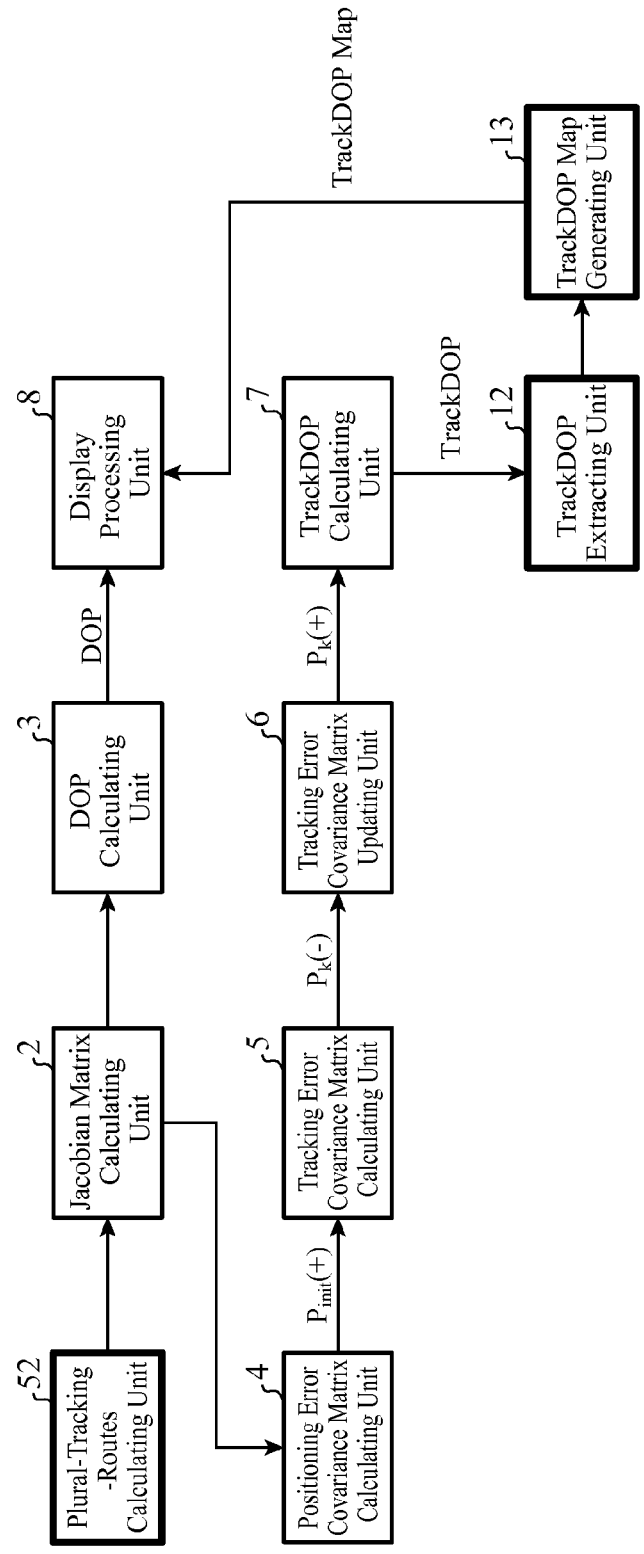
FIG. 14 is a structural diagram showing a positioning and tracking device in accordance with Embodiment 7 of the present invention.

FIG. 14 is a structural diagram showing a positioning and tracking device in accordance with Embodiment 7 of the present invention. In the figure, because the same reference numerals as those shown in FIG. 5 denote the same components or like components, the explanation of the components will be omitted hereafter.

A plural-tracking-routes calculating unit 52 performs a process of calculating a plurality of tracking routes and setting up observation points on each of the plurality of tracking routes (observation points leading from a tracking start point Pstart to a tracking end point Pend).

In the example shown in FIG. 14, it is assumed that each of the plural-tracking-routes calculating unit 52, a Jacobian matrix calculating unit 2, a DOP calculating unit 3, a positioning error covariance matrix calculating unit 4, a tracking error covariance matrix calculating unit 5, a tracking error covariance matrix updating unit 6, a TrackDOP calculating unit 7, a TrackDOP extracting unit 12, a TrackDOP map generating unit 13, and a display processing unit 8, which are the components of the positioning and tracking device, consists of hardware for exclusive use (e.g., a semiconductor integrated circuit equipped with a CPU, or a one chip microcomputer). As an alternative, the positioning and tracking device can consist of a computer.

In the case in which the positioning and tracking device consists of a computer, a program which the processes carried out by the plural-tracking-routes calculating unit 52, the Jacobian matrix calculating unit 2, the DOP calculating unit 3, the positioning error covariance matrix calculating unit 4, the tracking error covariance matrix calculating unit 5, the tracking error covariance matrix updating unit 6, the TrackDOP calculating unit 7, the TrackDOP extracting unit 12, the TrackDOP map generating unit 13, and the display processing unit 8 are described can be stored in a memory of the computer, and a CPU of the computer can be made to execute the program stored in the memory.

Next, the operation of the positioning and tracking device will be explained.

While the plural-tracking-routes calculating unit 52 can set up not only a straight tracking route but also a tracking route which is not straight, like the tracking route calculating unit 51 shown in FIG. 12, the plural-tracking-routes calculating unit 52 can also set up a plurality of tracking routes.

Figure 15:
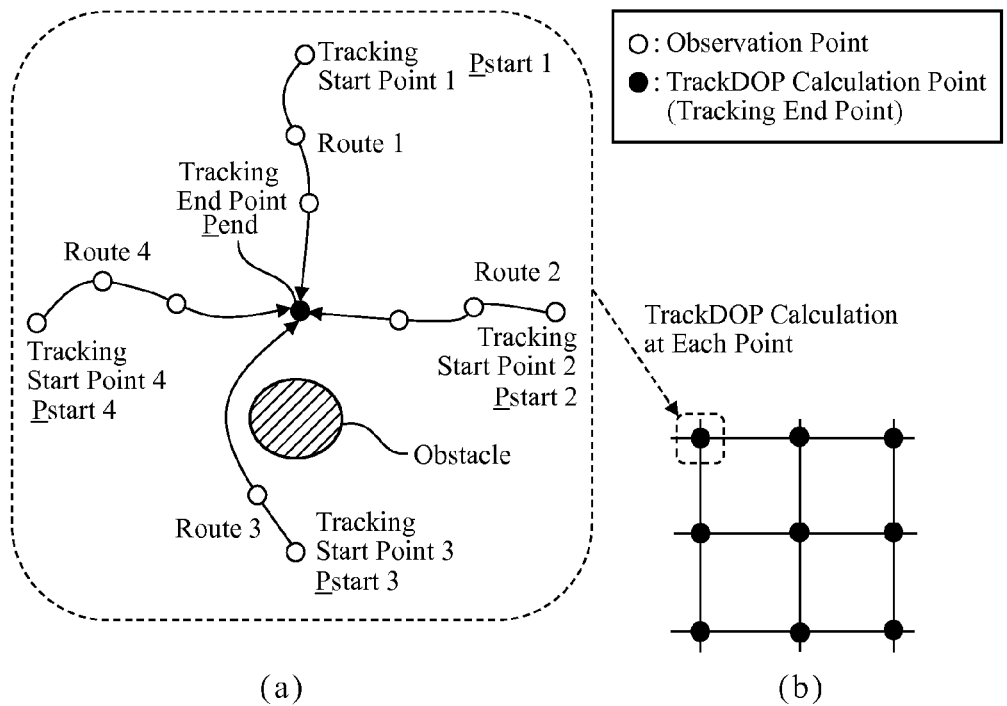
FIG. 15 is an explanatory drawing showing that evaluation indices TrackDOPs for tracking accuracy are calculated for each of observation points set up on each of a plurality of tracking routes.
Figure 16:
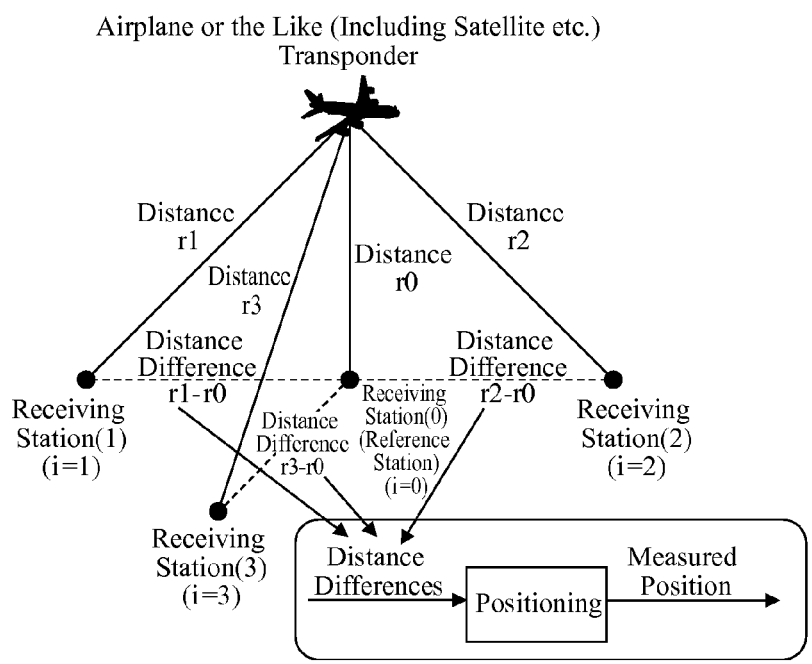
FIG. 16 is an explanatory drawing showing the measurement of the position of a target which is carried out by a positioning and tracking device disclosed by nonpatent reference 1.
Figure 17:
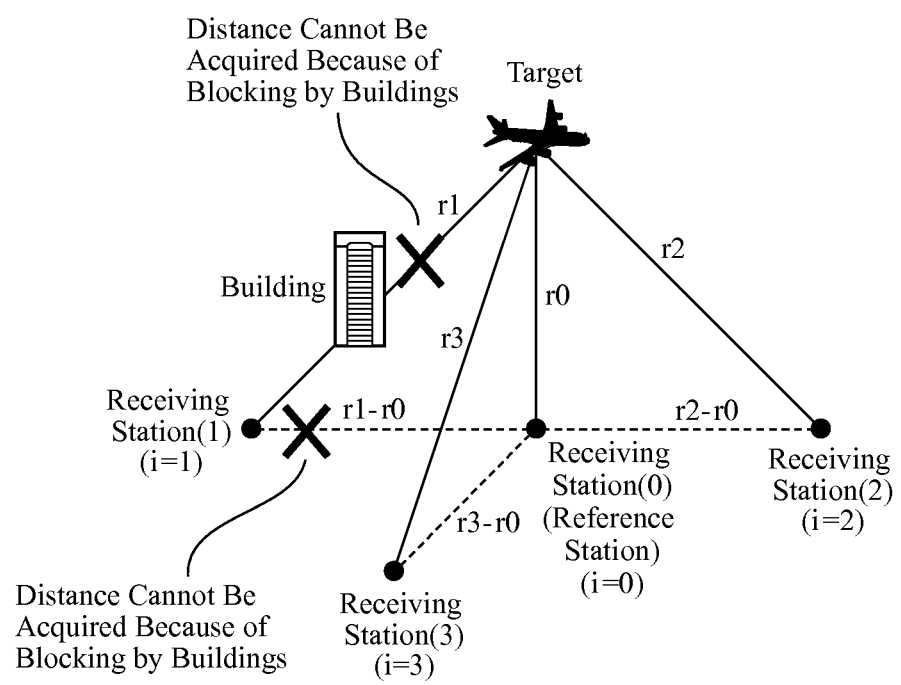
FIG. 17 is an explanatory drawing showing a situation in which the distance cannot be acquired by a receiving station (1) because of blocking by buildings, and, as a result, the distance difference of the receiving station (1) cannot be acquired.
Figure 18:
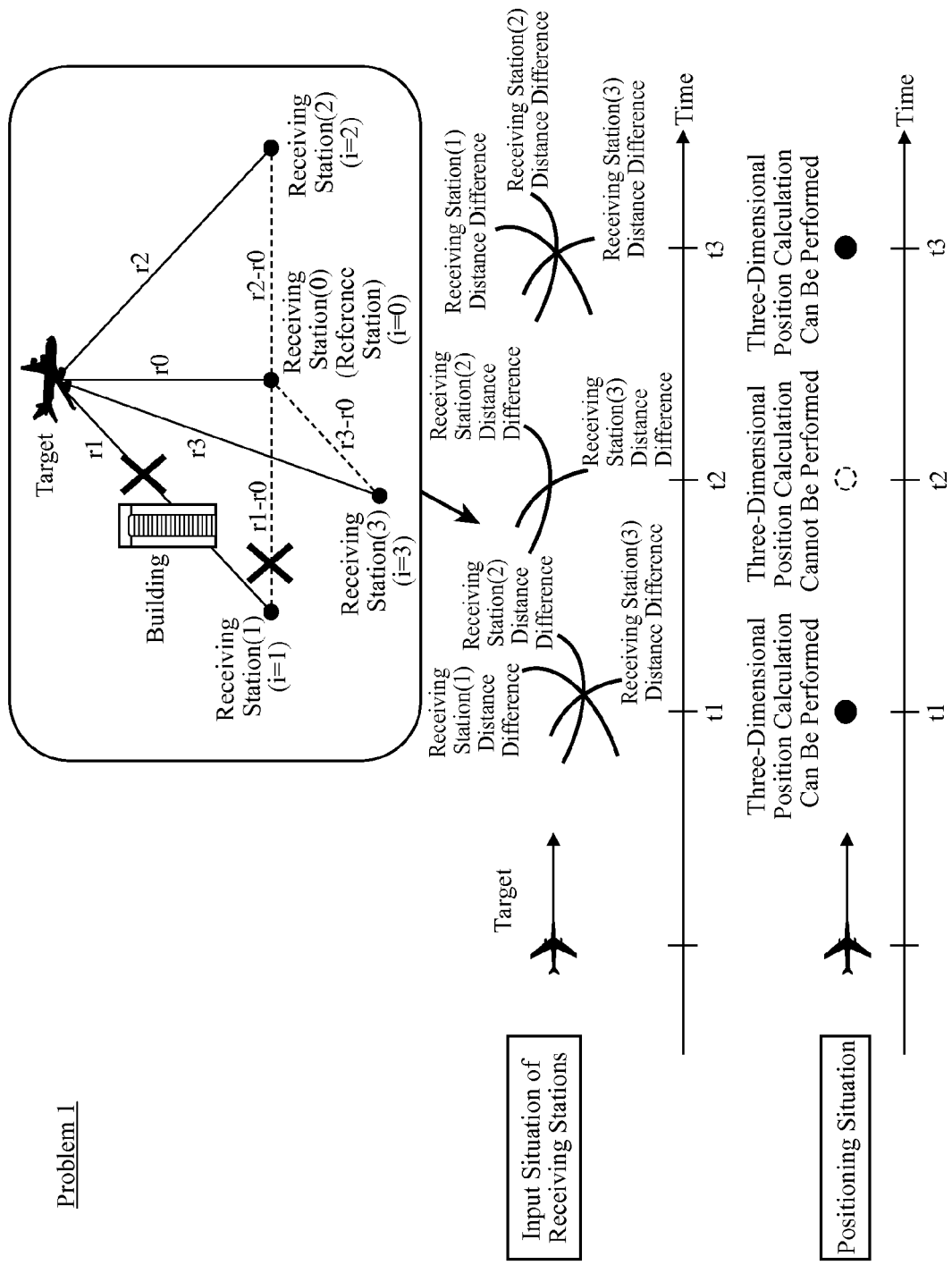
FIG. 18 is an explanatory drawing showing an example of problem 1.
Figure 19:
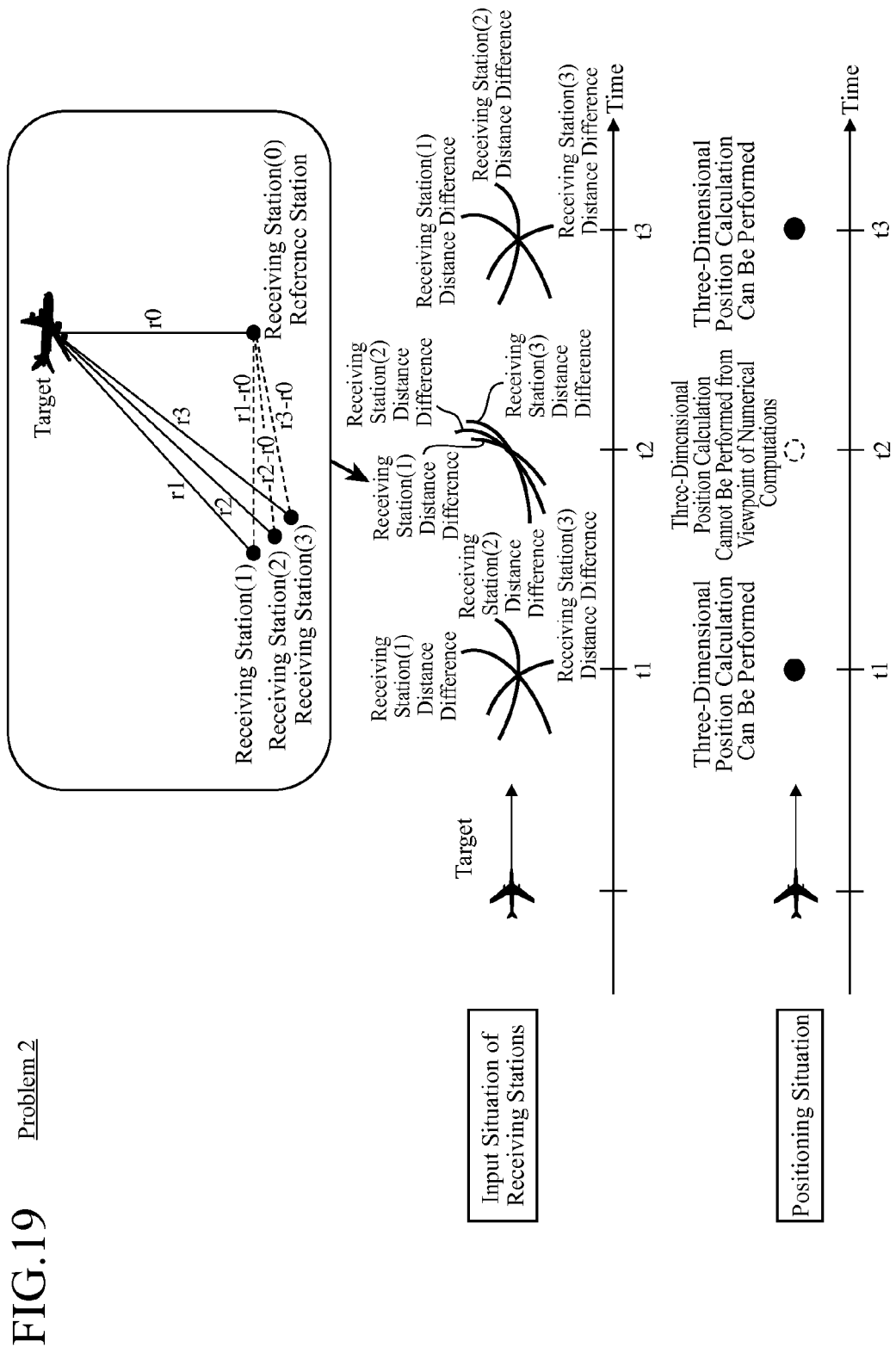
FIG. 19 is an explanatory drawing showing an example of problem 2.
Figure 20:
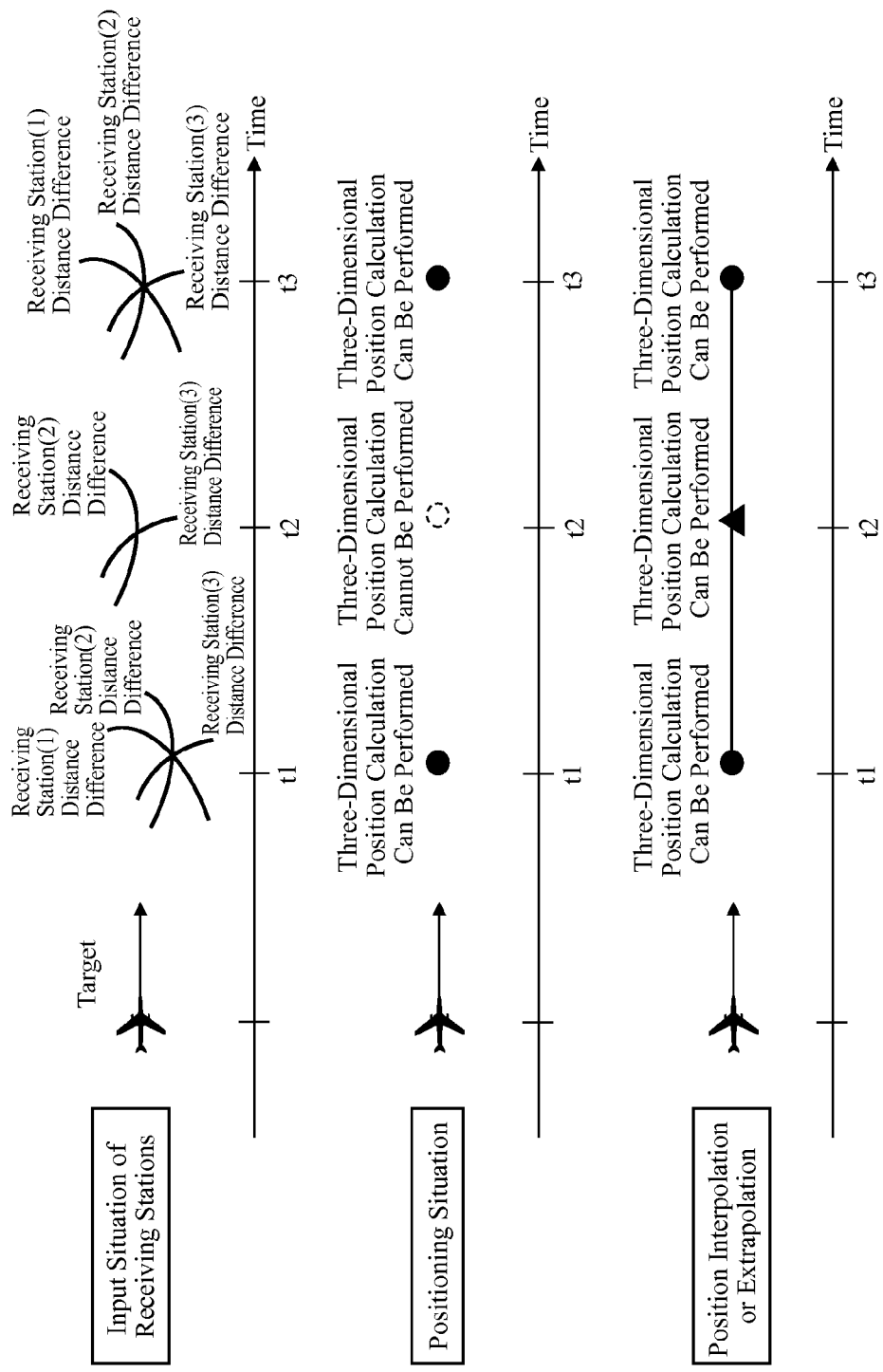
FIG. 20 is an explanatory drawing showing an example of measuring a three-dimensional position at a time t2 by performing interpolation calculation or extrapolation calculation.
Figure 21:
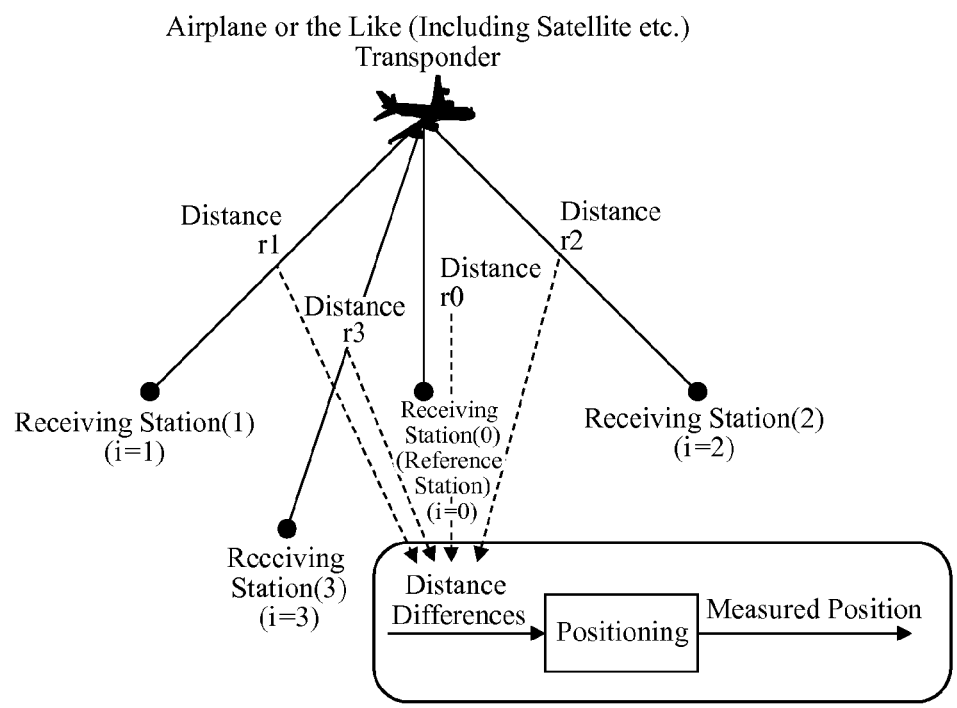
FIG. 21 is an explanatory drawing showing an example of measuring the position of a target from the distances between a reference station and receiving stations (1) to (3).

In this Embodiment 7, as shown in FIG. 15, a plurality of tracking routes are set up and observation points (observation points leading from a tracking start point Pstart to a tracking end point Pend) are set up on each of the plurality of tracking routes.

FIG. 15 is an explanatory drawing showing that an evaluation index TrackDOP for tracking accuracy is calculated for each of the observation points set up on each of the plurality of tracking routes.

After setting up the observation points on each of the plurality of tracking routes, the plural-tracking-routes calculating unit 52 arranges the observation points on a grid, as shown in FIG. 15 (b), and outputs a combination of the tracking start point Pstart, the tracking endpoint Pend, a sampling Ta, a velocity vector Va, and the number Na of observation points for each of the observation points.

Although a detailed explanation of the processes from the process by the Jacobian matrix calculating unit 2 to the process by the TrackDOP calculating unit 7 is omitted because the processes are the same as those in accordance with above-mentioned Embodiment 1, in this Embodiment 7, an evaluation index TrackDOP for the tracking accuracy is calculated for each of the observation points set up on each of the plurality of tracking routes because the plurality of tracking routes are set up.

For each of the tracking routes, the TrackDOP extracting unit 12 extracts the evaluation indices TrackDOPs for the tracking accuracy at the observation points on the tracking route from among the evaluation indices TrackDOPs for the tracking accuracy which are calculated for the observation points on the tracking routes by the TrackDOP calculating unit 7, and calculates a maximum, a minimum, and an average of the evaluation indices TrackDOPs for the tracking accuracy, like that in accordance with above-mentioned Embodiment 2.

After the TrackDOP extracting unit 12 calculates the maximum, the minimum, and the average of the evaluation indices TrackDOPs for the tracking accuracy for each of the routes, the TrackDOP map generating unit 13 generates a TrackDOP map from the maximum, the minimum, and the average, like that in accordance with above-mentioned Embodiment 2.

The display processing unit 8 displays the TrackDOP map generated by the TrackDOP map generating unit 13 on a display or the like.

By displaying the TrackDOP map, the display processing unit 8 can geographically show the dilutions of precision on which a tracking process has been performed from the viewpoint of a reduction in the dilutions of precision for the tracking of a final output to an operator. Therefore, a minimum number of receiving stations can be allocated as the number of receiving stations from the viewpoint of a reduction in tracking errors.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

Because the positioning and tracking device in accordance with the present invention includes the tracking error covariance matrix updater that updates the covariance matrix of tracking errors calculated by the tracking error covariance matrix calculator by using the nominal observation error parameter, and the tracking accuracy evaluation index calculator that calculates evaluation indices for the tracking accuracy for the target by using both the covariance matrix of tracking errors updated by the tracking error covariance matrix updater and the nominal observation error parameter, and can present the evaluation indices for the tracking accuracy for the target even in a situation in which the measurement of the target position and the calculation of the evaluation indices for the positioning accuracy cannot be carried out, the positioning and tracking device is suitable for use as a positioning and tracking device targeted for an airplane, a satellite, etc.

EXPLANATIONS OF REFERENCE NUMERALS 1 observation point setting unit, 2 Jacobian matrix calculating unit (observed value acquiring unit, Jacobian matrix calculator), 3 DOP calculating unit (positioning accuracy evaluation index calculator), 4 positioning error covariance matrix calculating unit (tracking error covariance matrix calculator), 5 tracking error covariance matrix calculating unit (tracking error covariance matrix calculator), 6 tracking error covariance matrix updating unit (tracking error covariance matrix updater), 7 TrackDOP calculating unit (tracking accuracy evaluation index calculator), 8 display processing unit (evaluation index presenter), 11 observation point setting unit, 12 TrackDOP extracting unit (tracking accuracy evaluation index calculator), 13 TrackDOP map generating unit, 21 distance difference prediction error parameter calculating unit (tracking accuracy evaluation index calculator), 22 distance difference error parameter calculating unit (tracking accuracy evaluation index calculator), 23 TrackDOP calculating unit (tracking accuracy evaluation index calculator), 31 variance suppression ratio parameter setting unit (tracking accuracy evaluation index calculator), 32 distance difference error parameter calculating unit (tracking accuracy evaluation index calculator), 33 TrackDOP calculating unit (tracking accuracy evaluation index calculator), 41 missing observation point setting unit (missing observation point setter), 42 tracking error covariance matrix updating unit (tracking error covariance matrix updater), 51 tracking route calculating unit, 52 plural-tracking-routes calculating unit.

The invention claimed is:

1. A positioning and tracking device comprising one or more processors configured to:
   acquire observed values of a plurality of receiving stations for each of observation points leading from a tracking start point of a target to a tracking end point of the target;
   calculate a Jacobian matrix of observed values associated with all the receiving stations by using the observed values;
   calculate an evaluation index for positioning accuracy for said target by using the Jacobian matrix;
   calculate a covariance matrix of positioning errors by using both the Jacobian matrix and a preset nominal observation error parameter;
   calculate a covariance matrix of tracking errors from the covariance matrices of positioning errors at first two observation points;
   update the covariance matrix of tracking errors by using said nominal observation error parameter;
   calculate an evaluation index for tracking accuracy for said target by using both the updated covariance matrix of tracking errors and said nominal observation error parameter; and
   generate a map for presentation on a display, the map being based at least in part on the evaluation index for the positioning accuracy and the evaluation index for the tracking accuracy.

2. The positioning and tracking device according to claim 1, wherein at least one of the one or more processors is configured to acquire, as the observed values of the plurality of receiving stations, distance differences between a distance from a receiving station which serves as a reference, among the plurality of receiving stations, to said target, and distances from remaining receiving stations to said target for each of the observation points leading from the tracking start point of the target to the tracking end point of the target, and calculate a Jacobian matrix of distance differences associated with all the receiving stations by using the acquired distance differences.

3. The positioning and tracking device according to claim 1, wherein when a plurality of tracking start points are set up, at least one of the one or more processors is configured to calculate the evaluation index for the tracking accuracy for the target by using the updated covariance matrix of tracking errors for each of the observation points leading from each of the plurality of tracking start points to the tracking end point, and calculate a maximum, a minimum, and an average of said evaluation indices.

4. The positioning and tracking device according to claim 1, wherein at least one of the one or more processors is configured to
   calculate a distance difference prediction error parameter from a preset predicted position error and the Jacobian matrix, the distance difference prediction error parameter being obtained by transforming the preset predicted position error into a parameter of distance difference space,
   calculate a new nominal observation error parameter by using both said distance difference prediction error parameter and the nominal observation error parameter, and
   calculate the evaluation index for the tracking accuracy for the target by using both the updated covariance matrix of tracking errors and the new nominal observation error parameter.

5. The positioning and tracking device according to claim 1, wherein at least one of the one or more processors is configured to
   calculate a distance difference error parameter from a distribution suppression ratio which is a ratio of the nominal observation error parameter to a distance difference prediction error parameter, the distance difference prediction error parameter being obtained by transforming the preset predicted position error into a parameter of distance difference space by using the Jacobian matrix,
   calculate a new nominal observation error parameter from both the distribution suppression ratio and the nominal observation error parameter, and
   calculate the evaluation index for the tracking accuracy for the target by using both the updated covariance matrix of tracking errors and the new nominal observation error parameter.

6. The positioning and tracking device according to claim 1, wherein at least one of the one or more processors is configured to set up a missing observation point where no observed value is acquired from among the observation points leading from the tracking start point of the target to the tracking end point of the target, and, for the missing observation point, output the covariance matrix of tracking errors without updating said covariance matrix of tracking errors.

7. The positioning and tracking device according to claim 1, wherein at least one of the one or more processors is configured to acquire the observed values of the plurality of receiving stations for each of observation points existing on a preset tracking route of the target.

8. The positioning and tracking device according to claim 7, wherein when a plurality of tracking routes are set up, at least one of the one or more processors is configured to calculate the evaluation index for the tracking accuracy for the target for each of observation points existing on each of the plurality of tracking routes by using the updated covariance matrix of tracking errors, and calculate a maximum, a minimum, and an average of said evaluation indices.

* * * * *